(12) United States Patent
Kim et al.

(10) Patent No.: US 12,216,251 B2
(45) Date of Patent: Feb. 4, 2025

(54) ELECTRONIC DEVICE INCLUDING LENS ASSEMBLY

(71) Applicant: Samsung Electronics Co., Ltd., Gyeonggi-do (KR)

(72) Inventors: Haneung Kim, Gyeonggi-do (KR); Jungpa Seo, Gyeonggi-do (KR); Sungwook Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 524 days.

(21) Appl. No.: 17/530,566

(22) Filed: Nov. 19, 2021

(65) Prior Publication Data

US 2022/0174194 A1 Jun. 2, 2022

Related U.S. Application Data

(63) Continuation of application No. PCT/KR2021/016400, filed on Nov. 11, 2021.

(30) Foreign Application Priority Data

Nov. 30, 2020 (KR) .................. 10-2020-0164355

(51) Int. Cl.
*G02B 9/64* (2006.01)
*G02B 3/04* (2006.01)
(Continued)

(52) U.S. Cl.
CPC ........... *G02B 13/0045* (2013.01); *G02B 3/04* (2013.01); *G02B 5/208* (2013.01); *G02B 9/64* (2013.01)

(58) Field of Classification Search
CPC ...... G02B 13/0045; G02B 3/04; G02B 5/208; G02B 9/64; G02B 9/60; G02B 9/62; H04N 23/55
(Continued)

(56) References Cited

U.S. PATENT DOCUMENTS 6,008,953 A * 12/1999 Itoh .................... G02B 15/1421
359/717
7,808,726 B2 * 10/2010 Sueyoshi ............... G02B 13/04
348/335
(Continued)

FOREIGN PATENT DOCUMENTS

JP 2004-093593 A 3/2004
JP 2007-212877 A 8/2007
(Continued)

OTHER PUBLICATIONS

International Search Report Dated Feb. 11, 2022.

*Primary Examiner* — William R Alexander
(74) *Attorney, Agent, or Firm* — Cha & Reiter, LLC

(57) ABSTRACT

According to an embodiment of the disclosure, an electronic device may include a lens assembly including a first lens group having positive refractive power and a second lens group having negative refractive power and an image sensor configured to output an image signal based on light transmitted through the first lens group and the second lens group. A second distance between the first lens group and the second lens group and a third distance between the lens assembly and the image sensor may be configured to be changed based on a first distance between a subject and the electronic device.

20 Claims, 14 Drawing Sheets

(51) Int. Cl.
  *G02B 5/20* (2006.01)
  *G02B 13/00* (2006.01)
(58) Field of Classification Search
  USPC ............................... 359/793, 785, 784, 754
  See application file for complete search history.

(56) References Cited

U.S. PATENT DOCUMENTS

| | | | | |
|---|---|---|---|---|
| 8,917,456 | B2* | 12/2014 | Ori | G02B 13/18 |
| | | | | 359/683 |
| 2009/0225445 | A1* | 9/2009 | Sueyoshi | G02B 7/08 |
| | | | | 359/793 |
| 2011/0102908 | A1* | 5/2011 | Murayama | G02B 13/18 |
| | | | | 359/687 |
| 2013/0265649 | A1 | 10/2013 | Ohashi | |
| 2014/0071333 | A1* | 3/2014 | Kanetaka | G02B 9/34 |
| | | | | 359/791 |
| 2014/0177071 | A1* | 6/2014 | Saito | G02B 15/177 |
| | | | | 359/691 |
| 2014/0247506 | A1* | 9/2014 | Ori | G02B 13/18 |
| | | | | 359/708 |
| 2014/0354876 | A1 | 12/2014 | Shin et al. | |
| 2016/0313543 | A1 | 10/2016 | Nakahara | |
| 2017/0108668 | A1 | 4/2017 | Sekine | |
| 2017/0123186 | A1 | 5/2017 | Shin et al. | |
| 2017/0235109 | A1 | 8/2017 | Shin et al. | |
| 2017/0242220 | A1* | 8/2017 | Lee | G02B 13/0045 |
| 2017/0269339 | A1 | 9/2017 | Jung et al. | |
| 2018/0045921 | A1 | 2/2018 | Kumazawa et al. | |
| 2018/0275380 | A1 | 9/2018 | Sudoh | |
| 2020/0183128 | A1 | 6/2020 | Lee et al. | |

FOREIGN PATENT DOCUMENTS

| | | |
|---|---|---|
| JP | 2013-195588 A | 9/2013 |
| JP | 2016-206491 A | 12/2016 |
| JP | 2017-227667 A | 12/2017 |
| JP | 2018-156011 A | 10/2018 |
| KR | 1999-016336 A | 3/1999 |
| KR | 10-2011-0056104 A | 5/2011 |
| KR | 10-2017-0109469 A | 9/2017 |
| KR | 10-2020-0068924 A | 6/2020 |
| KR | 10-2020-0075794 A | 6/2020 |

* cited by examiner

ELECTRONIC DEVICE INCLUDING LENS ASSEMBLY

CROSS-REFERENCE TO RELATED APPLICATION(S)

This application is a continuation application, claiming priority under § 365 (c), of an International application No. PCT/KR2021/016400, filed on Nov. 11, 2021, which is based on and claims the benefit of a Korean patent application number 10-2020-0164355, filed on Nov. 30, 2020, in the Korean Intellectual Property Office, the disclosures of which is incorporated by reference herein in its entirety.

TECHNICAL FIELD

One or more embodiments of the instant disclosure generally relate to a lens assembly, and to an electronic device including the lens assembly and/or a camera module including the lens assembly.

BACKGROUND ART

With the development of information and communication technology and semiconductor technology, various functions are being integrated into one portable electronic device. For example, an electronic device may implement not only communication functions but also entertainment functions, such as playing games, multimedia functions, such as taking images, playing music and videos, communication and security functions for mobile banking, scheduling and e-wallet functions. Such electronic devices become compact enough to be portable so that users can conveniently carry them on the go.

Optical devices, e.g., cameras capable of capturing images or videos, have been widely used. Recently, digital cameras or video cameras using a solid-state image sensor, such as a charge coupled device (CCD) type image sensor or complementary metal-oxide semiconductor (CMOS) type image sensor, have been used. Solid image sensor (CCD or CMOS)-adopted optical devices may be suitable for miniaturization and the digital nature of these optical devices allows them to easily save, copy, or move images as compared with film-type optical devices.

To obtain high-quality images and/or videos, a plurality of lenses may be put to use. A lens assembly having a combination of multiple lenses may have a lower F-number and smaller aberration compared to single lens configurations and thus enables the obtaining of higher-quality (higher-resolution) images and/or videos. Multiple lenses may be required to achieve the low F-number and low aberrations. Optical devices have typically been configured for devices used specifically for image capturing, such as digital cameras, but recently are being equipped in compact electronic devices such as mobile communication terminals.

DISCLOSURE

Technical Problem

To mount an optical device, such as a lens assembly, in a miniaturized electronic device, it is necessary to reduce the overall length (total length and/or height in the optical axis direction) of the lens assembly, so that the number of lenses included in the lens assembly may be limited. The limit in the number of lenses included in the lens assembly may render it difficult to obtain high-quality images and/or videos. For example, with a limited number of lenses alone, it may be hard to manufacture a lens assembly with a low F-number and smaller aberration.

According to one or more embodiments of the disclosure, there may be provided an electronic device including a lens assembly capable of obtaining high-quality images and/or videos while being mountable in a miniaturized electronic device by adjusting the distance between a first lens group and a second lens group.

The disclosure is not limited to the foregoing embodiments but various modifications or changes may rather be made thereto without departing from the spirit and scope of the disclosure.

Technical Solution

According to an embodiment of the disclosure, an electronic device may comprise a lens assembly including a first lens group having positive refractive power and a second lens group having negative refractive power and an image sensor configured to output an image signal based on light transmitted through the first lens group and the second lens group. A second distance between the first lens group and the second lens group and a third distance between the lens assembly and the image sensor may be configured to be changed based on a first distance between a subject and the electronic device.

According to an embodiment of the disclosure, an electronic device may comprise a housing, a camera module disposed in the housing, the camera module including a lens assembly including a first lens group having positive composite refractive power and including at least four lenses, a second lens group having negative refractive power, and an image sensor configured to output an image signal based on light transmitted through the first lens group and the second lens group, and a processor configured to adjust a second distance between the first lens group and the second lens group and a third distance between the lens assembly and the image sensor based on a first distance between a subject and the electronic device.

According to an embodiment of the disclosure, a camera module may comprise a lens assembly including a first lens group having positive refractive power and a second lens group having negative refractive power and an image sensor configured to output an image signal based on light transmitted through the first lens group and the second lens group. A second distance between the first lens group and the second lens group and a third distance between the lens assembly and the image sensor may be configured to be changed based on a first distance between a subject and the camera module.

Advantageous Effects

According to certain embodiments of the disclosure, the lens assembly may be easily mounted in a miniaturized electronic device by adjusting the distance between the lenses of the lens assembly.

According to certain embodiments of the disclosure, it is possible to enhance the quality of the image obtained from the camera module by adjusting the distance between the first lens group and the second lens group in the electronic device based on the distance between the subject and the electronic device.

MODE FOR INVENTION

Figure 1:
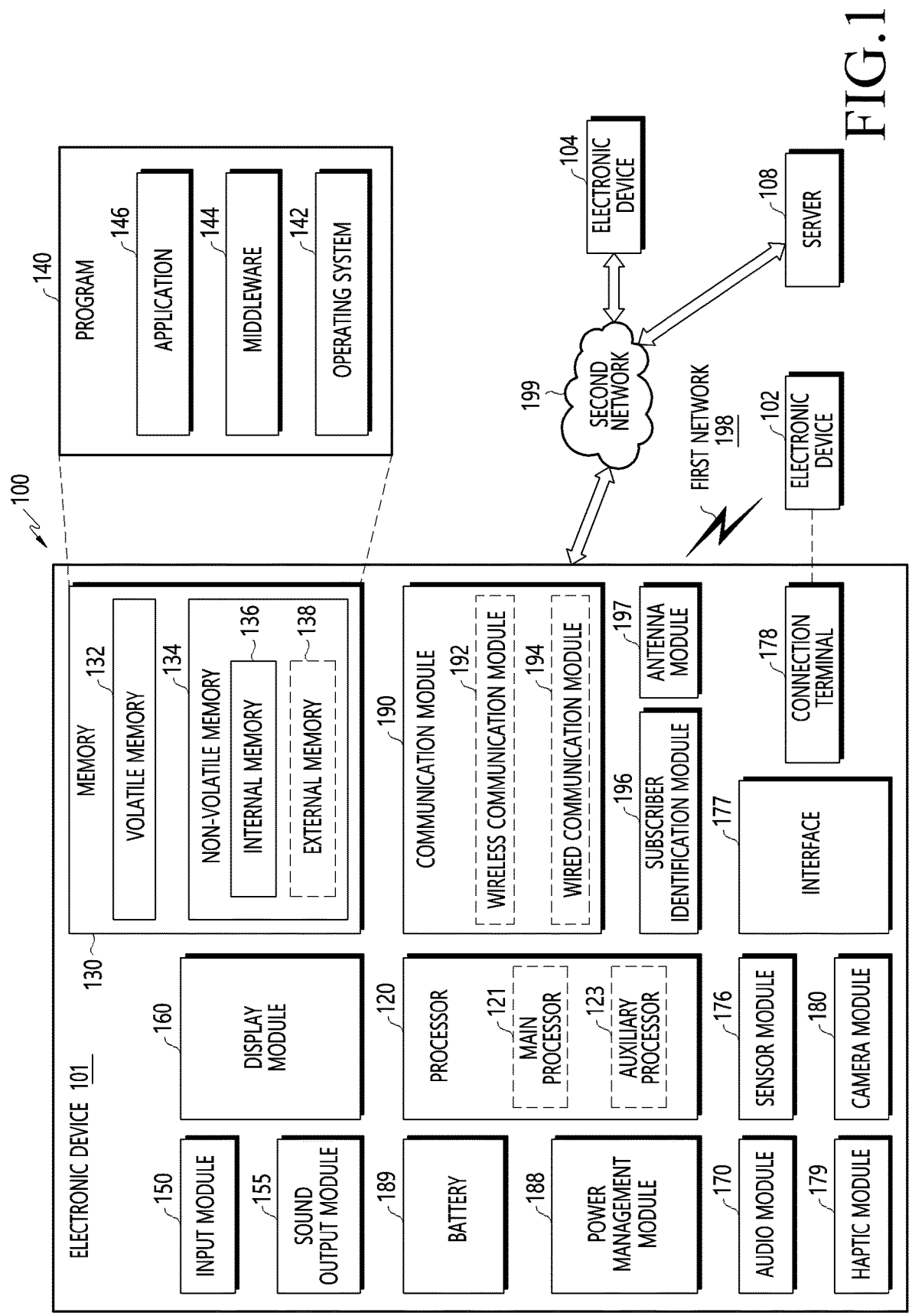
FIG. 1 is a block diagram illustrating an electronic device in a network environment according to an embodiment of the disclosure.

FIG. 1 is a block diagram illustrating an electronic device in a network environment according to various embodiments of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160). The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
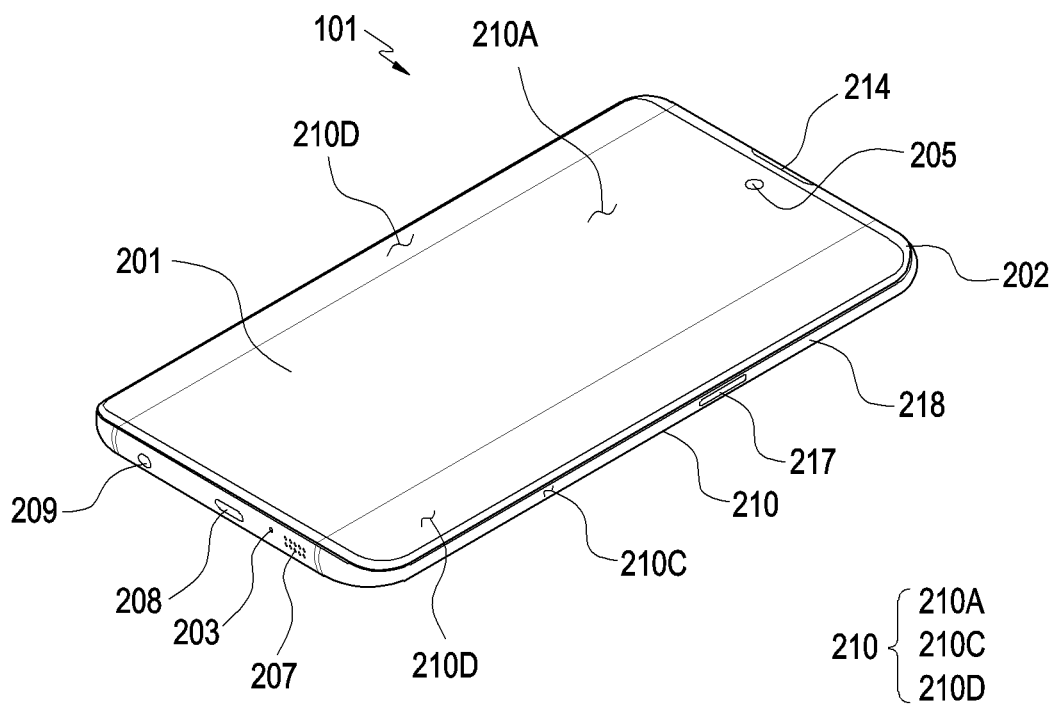
FIG. 2 is a front perspective view illustrating an electronic device according to an embodiment of the disclosure.
Figure 3:
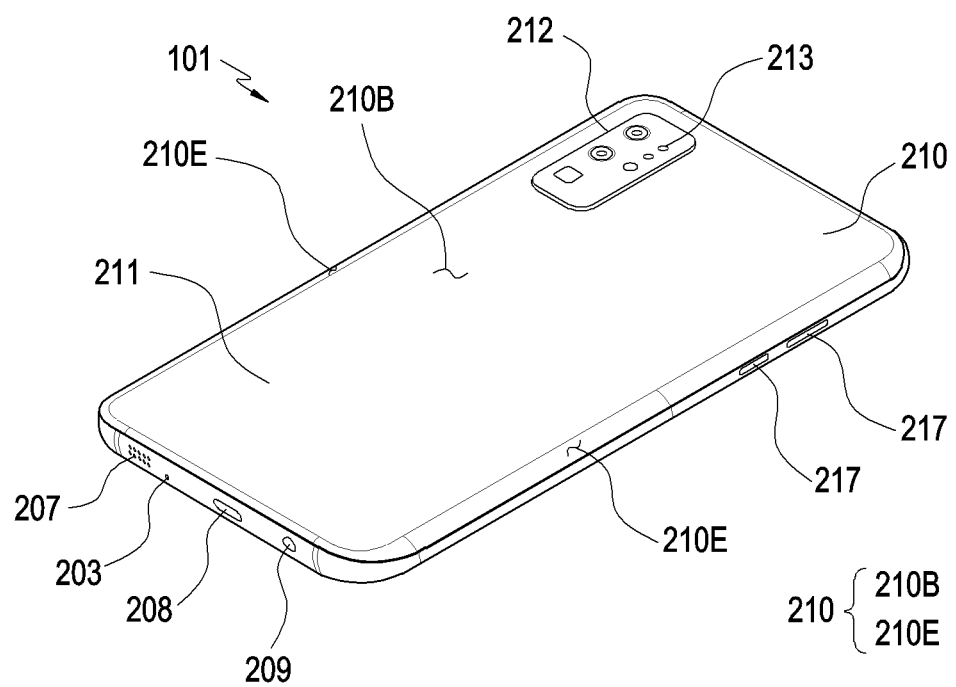
FIG. 3 is a rear perspective view illustrating an electronic device according to an embodiment of the disclosure.

FIG. 2 is a front perspective view illustrating an electronic device according to an embodiment of the disclosure. FIG. 3 is a rear perspective view illustrating an electronic device according to an embodiment of the disclosure.

Referring to FIGS. 2 and 3, according to an embodiment, an electronic device 101 may include a housing 210 with a front surface 210A, a rear surface 210B, and a side surface 210C surrounding a space between the front surface 210A and the rear surface 210B. According to another embodiment (not shown), the housing 210 may refer to a structure forming part of the front surface 210A, the rear surface 210B, and the side surface 210C of FIG. 2. According to an embodiment, at least part of the front surface 210A may have a substantially transparent front plate 202 (e.g., a glass plate or polymer plate including various coat layers). The rear surface 210B may be formed by a rear plate 211. The rear plate 211 may be made of, e.g., glass, ceramic, polymer, metal (e.g., aluminum, stainless steel (STS), or magnesium), or a combination of at least two thereof. The side surface 210C may be formed by a side bezel structure (or a "side member") 218 that couples to the front plate 202 and the rear plate 211 and includes a metal and/or polymer. According to an embodiment, the rear plate 211 and the side bezel plate 218 may be integrally formed together and include the same material (e.g., glass, metal, such as aluminum, or ceramic).

In the embodiment illustrated, the front plate 202 may include two first edge areas 210D, which seamlessly and bendingly extend from the first surface 210A to the rear plate 211, on both the long edges of the front plate 202. In the embodiment (refer to FIG. 3) illustrated, the rear plate 211 may include two second edge areas 210E, which seamlessly and bendingly extend from the rear surface 210B to the front plate 202, on both the long edges. According to an embodiment, the front plate 202 (or the rear plate 211) may include only one of the first edge areas 210D (or the second edge areas 210E). According to another embodiment, the first edge areas 210D or the second edge areas 210E may partially be excluded. According to an embodiment, at side view of the electronic device 101, the side bezel structure 218 may have a first thickness (or width) for sides that do not have the first edge areas 210D or the second edge areas 210E and a second thickness, which is smaller than the first thickness, for sides that have the first edge areas 210D or the second edge areas 210E.

According to an embodiment, the electronic device 101 may include at least one of a display 201, audio modules 203, 207, and 214 (e.g., the audio module 170 of FIG. 1), a sensor module (e.g., the sensor module of FIG. 1). 176), camera modules 205 and 212 (e.g., the camera module 180 of FIG. 1), a key input device 217 (e.g., the input module 150 of FIG. 1), and connector holes 208 and 209 (e.g., the connection terminal 178 of FIG. 1). According to an embodiment, the electronic device 101 may exclude at least one (e.g., the connector hole 209) of the components or may add other components.

According to an embodiment, the display 201 may be visually exposed through, e.g., a majority portion of the front plate 202. According to an embodiment, at least a portion of the display 201 may be exposed through the front plate 202 forming the front surface 210A and the first edge areas 210D. According to an embodiment, the edge of the display 201 may be formed to be substantially the same in shape as an adjacent outer edge of the front plate 202.

According to another embodiment (not shown), the interval between the outer edge of the display 201 and the outer edge of the front plate 202 may remain substantially even to maximize the area of exposure for the display 201.

According to an embodiment, the surface (or the front plate 202) of the housing 210 may include a screen display area formed as the display 201 is visually exposed. For example, the screen display area may include the front surface 210A and first edge areas 210D.

According to an embodiment, a recess or opening may be formed in a portion of the screen display area (e.g., the front surface 210A or the first edge area 210D) of the display 201, and at least one or more of the audio module 214, sensor module (not shown), light emitting device (not shown), and camera module 205 may be aligned with the recess or opening. According to another embodiment (not shown), at least one or more of the audio module 214, sensor module (not shown), camera module 205, fingerprint sensor (not shown), and light emitting device (not shown) may be included on the rear surface of the screen display area of the display 201.

According to an embodiment (not shown), the display 201 may be disposed to be coupled with, or adjacent to, a touch detecting circuit, a pressure sensor capable of measuring the strength (pressure) of touches, and/or a digitizer for detecting a magnetic field-type stylus pen.

According to an embodiment, at least part of the key input device 217 may be disposed in the first edge areas 210D and/or the second edge areas 210E.

According to an embodiment, the audio modules 203, 207, and 214 may include, e.g., a microphone hole 203 and speaker holes 207 and 214. The microphone hole 203 may have a microphone inside to obtain external sound. According to an embodiment, there may be a plurality of microphones to detect the direction of a sound. The speaker holes 207 and 214 may include an external speaker hole 207 and a phone receiver hole 214. According to an embodiment, the speaker holes 207 and 214 and the microphone hole 203 may be implemented as a single hole, or speakers may be included without the speaker holes 207 and 214 (e.g., piezo speakers).

According to an embodiment, the sensor modules (not shown) may generate an electrical signal or data value corresponding to an internal operating state or external environmental state of the electronic device 101. The sensor modules (not shown) may include a first sensor module (not shown) (e.g., a proximity sensor) and/or a second sensor module (not shown) (e.g., a fingerprint sensor) disposed on the front surface 210A of the housing 210 and/or a third sensor module (not shown) (e.g., an HRM sensor) and/or a fourth sensor module (not shown) (e.g., a fingerprint sensor) disposed on the rear surface 210B of the housing 210. In an embodiment (not shown), the fingerprint sensor may be disposed on the rear surface 210B as well as on the front surface 210A (e.g., the display 201) of the housing 210. The electronic device 101 may further include sensor modules not shown, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor (not shown).

According to an embodiment, the camera modules 205 and 212 may include a front camera module 205 disposed on the first surface 210A of the electronic device 101 and a rear camera module 212 and/or a flash 213 disposed on the rear surface 210B. The camera modules 205 and 212 may include one or more lenses, an image sensor, and/or an image signal processor. The flash 213 may include, e.g., a light emitting diode (LED) or a xenon lamp. According to an embodiment, two or more lenses (an infrared (IR) camera, a wide-angle lens, and a telescopic lens) and image sensors may be disposed on one surface of the electronic device 101.

According to an embodiment, the key input device 217 may be disposed on the side surface 210C of the housing 210. According to an embodiment, the electronic device 101 may exclude all or some of the above-mentioned key input devices 217 and the excluded key input devices 217 may be implemented in other forms, e.g., as soft keys, on the display 201.

According to an embodiment, the light emitting device (not shown) may be disposed on, e.g., the front surface 210A of the housing 210. The light emitting device (not shown) may light up to provide, e.g., information about the state of the electronic device 101. According to another embodiment, the light emitting device (not shown) may provide a light source (e.g. flash) for the front camera module 205. The light emitting device (not shown) may include, e.g., a light emitting device (LED), an infrared (IR) LED, and/or a xenon lamp.

According to an embodiment, the connector holes 208 and 209 may include, e.g., a first connector hole 208 for receiving a connector (e.g., a universal serial bus (USB) connector) for transmitting or receiving power and/or data to/from an external electronic device and/or a second connector hole (e.g., an earphone jack) 209 for receiving a connector for transmitting or receiving audio signals to/from the external electronic device.

Figure 4:
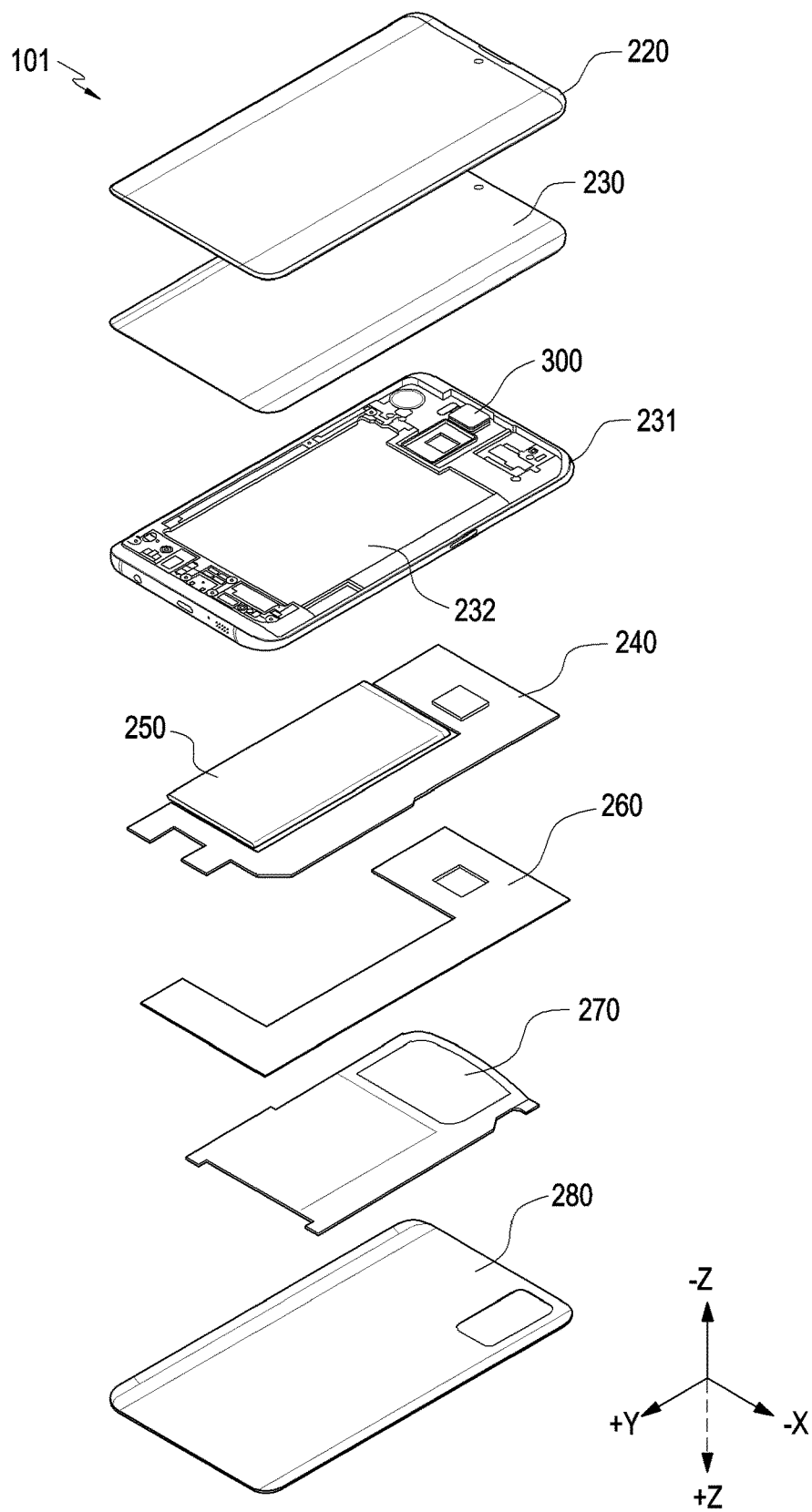
FIG. 4 is an exploded perspective view illustrating an electronic device according to an embodiment of the disclosure.

FIG. 4 is an exploded perspective view illustrating an electronic device according to an embodiment of the disclosure.

Referring to FIG. 4, an electronic device 101 (e.g., the electronic device 101 of FIGS. 2 to 3) may include a front plate 220 (e.g., the front plate 202 of FIG. 2), a display 230 (e.g., the display 201 of FIG. 2), a first supporting member 232 (e.g., a bracket), a main printed circuit board 240, a battery 250, a second supporting member 260 (e.g., a rear case), an antenna 270, and a rear plate 280 (e.g., the rear plate 211 of FIG. 3). According to an embodiment, the electronic device 101 may exclude at least one (e.g., the first supporting member 232 or the second supporting member 260) of the components or may add other components. At least one of the components of the electronic device 101 may be the same or similar to at least one of the components of the electronic device 101 of FIG. 2 or 3 and no duplicate description is made below.

According to an embodiment, the first supporting member 232 may be disposed inside the electronic device 101 to be connected with the side bezel structure 231 or integrated with the side bezel structure 231. The first supporting member 232 may be made of, e.g., a metal and/or non-metallic material (e.g., polymer). The display 230 may be disposed onto one surface of the first supporting member 232, and the printed circuit board 240 may be disposed onto the opposite surface of the first supporting member 311. A processor, memory, and/or interface may be mounted on the printed circuit board 240. The processor may include one or more of, e.g., a central processing unit, an application processor, a graphic processing device, an image signal processing, a sensor hub processor, or a communication processor.

According to an embodiment, the memory may include, e.g., a volatile or non-volatile memory.

According to an embodiment, the interface may include, for example, a high definition multimedia interface (HDMI), a universal serial bus (USB) interface, a secure digital (SD) card interface, and/or an audio interface. The interface may electrically or physically connect, e.g., the electronic device 101, with an external electronic device and may include a USB connector, an SD card/multimedia card (MMC) connector, or an audio connector.

According to an embodiment, the battery 250 may be a device for supplying power to at least one component (e.g., the image sensor 380 of FIG. 5) of the electronic device 101. The battery 250 may include, e.g., a primary cell which is not rechargeable, a secondary cell which is rechargeable, or a fuel cell. At least a portion of the battery 250 may be disposed on substantially the same plane as the printed circuit board 240. The battery 250 may be integrally or detachably disposed inside the electronic device 101.

According to an embodiment, the antenna 270 may be disposed between the rear plate 280 and the battery 250. The antenna 270 may include, e.g., a near-field communication (NFC) antenna, a wireless charging antenna, and/or a magnetic secure transmission (MST) antenna. The antenna 270 may perform short-range communication with, e.g., an external device or may wirelessly transmit or receive power necessary for charging. For example, the antenna 270 may include a coil for wireless charging. According to an embodiment, the antenna structure may be constituted by a at least a portion of the side bezel structure 231 or at least a portion of the first supporting member 232 or a combination thereof.

According to an embodiment, the electronic device 101 may include a camera module 300 disposed in the housing (e.g., the housing 210 of FIG. 2). According to an embodiment, the camera module 300 may be disposed on the first supporting member 232 and may be a front camera module (e.g., the camera module 205 of FIG. 2) capable of obtaining images of subjects positioned before (e.g., in the −Z direction) of the electronic device 101. According to another embodiment, the camera module 300 may be a rear camera module (e.g., the camera module 212 of FIG. 3) capable of obtaining images of subjects positioned behind (e.g., in the +Z direction) of the electronic device 101. For example, the housing 210 may receive the image sensor 380 and the lens assembly (e.g., the lens assembly 301 of FIG. 5) of the camera module 300.

The electronic device 101 disclosed in FIGS. 2 to 4 is generally of a bar-type or plate-type shape but the disclosure is not limited thereto. For example, the illustrated electronic device may be a rollable electronic device or a foldable electronic device. "Rollable electronic device" may mean an electronic device at least a portion of which may be wound or rolled or received in a housing (e.g., the housing 210 of FIG. 2) as the display (e.g., the display 230 of FIG. 4) may be bent and deformed. As the display is stretched out or is exposed to the outside in a larger area according to the user's need, the rollable electronic device may use an expanded second display area. "Foldable electronic device" may mean an electronic device that may be folded in directions to face two different areas of the display or in directions opposite to each other. In general, in the portable state, the foldable electronic device may be folded so that the two different areas of the display face each other and, in an actual use state, the user may unfold the display so that the two different areas form a substantially flat shape. In some embodiments, the electronic device 101 may be interpreted as various different electronic devices, such as laptop computers or cameras, as well as portable electronic devices, such as a smart phones.

Figure 5:
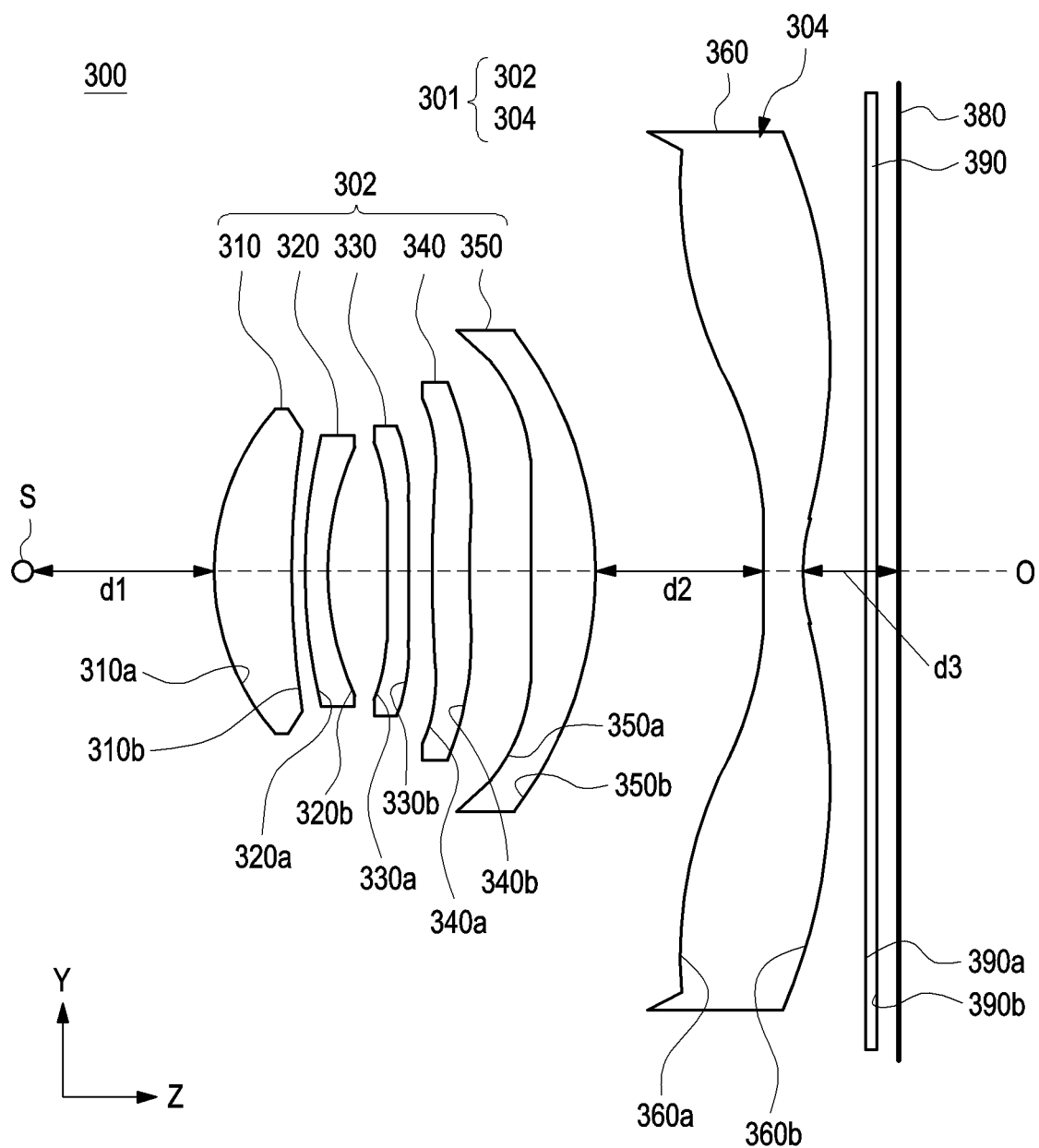
FIG. 5 is a view schematically illustrating a camera module according to first of various embodiments of the disclosure.
Figure 6:
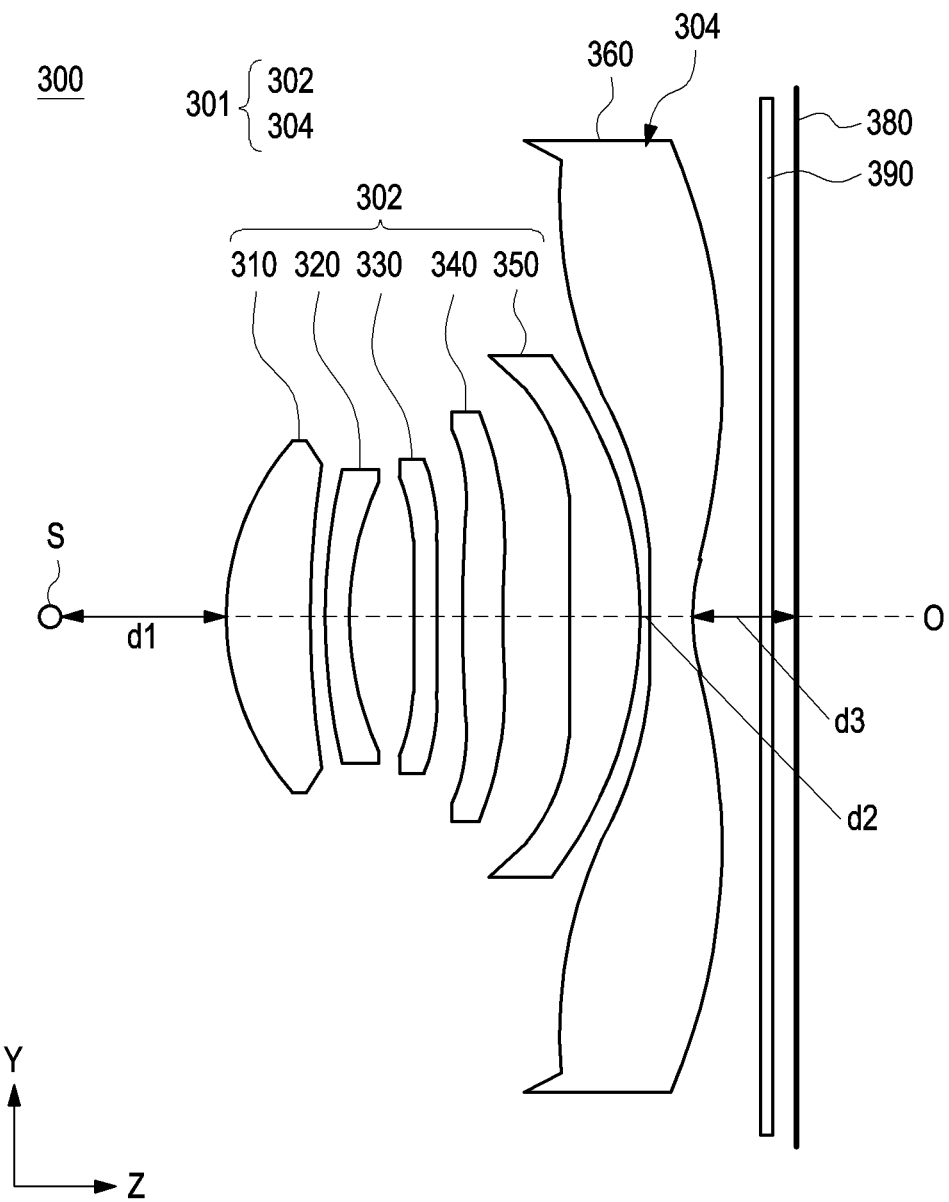
FIG. 6 is a view illustrating a distance between a first lens group and a second lens group of a camera module according to the first embodiment of the disclosure.

FIG. 5 is a view schematically illustrating a camera module according to one (e.g., a first embodiment) of various embodiments of the disclosure. FIG. 6 is a view illustrating a distance between a first lens group and a second lens group of a camera module according to an embodiment of the disclosure.

Referring to FIGS. 5 and 6, the camera module 300 may include a lens assembly 301 that in turn includes a plurality of lenses, an image sensor 380, and an optical filter 390. The configuration of the camera module 300 of FIG. 5 may be identical in whole or part to the configuration of the camera module 300 of FIG. 4.

According to an embodiment, at least a portion of the lens assembly 301 and the image sensor 380 may be received in a housing (e.g., the housing 210 of FIG. 2).

According to an embodiment, the lens assembly 301 may include a first lens group 302 and a second lens group 304 spaced apart from the first lens group 302.

According to an embodiment, the first lens group 302 may include a plurality of lenses. For example, the first lens group 302 may include a first lens 310, a second lens 320, a third lens 330, a fourth lens 340, and a fifth lens 350. According to an embodiment, the first lens 310, the second lens 320, the third lens 330, the fourth lens 340, and the fifth lens 350 may be sequentially arranged in a direction from the subject S to the image sensor 380 along the optical axis O. According to an embodiment, the first lens 310, the second lens 320, the third lens 330, the fourth lens 340, and/or the fifth lens 350 may be a plastic lens.

According to an embodiment, the first lens group 302 may have positive (+) composite refractive power. For example, the sum of the refractive powers of the first lens 310, the second lens 320, the third lens 330, the fourth lens 340, and the fifth lens 350 is positive (+). If light parallel to the first lens group 302 is incident, the light passing through the first lens group 302 may be focused.

According to an embodiment, the first surface 310a facing the subject S of the first lens 310 may be convex. For example, the first lens 310 may be a meniscus lens in which the first surface 310a is convex. As another example, the first lens 310 may include a convex first surface 310a and a convex second surface 310b.

According to an embodiment, the second lens group 304 may include at least one lens. For example, the second lens group 304 may include a sixth lens 360. According to an embodiment, the sixth lens 360 may be a lens having negative (−) refractive power, and accordingly in this embodiment the second lens group 304 may have negative (−) composite refractive power. According to an embodiment, if light parallel to the second lens group 304 is incident, the light passing through the second lens group 304 may be scattered. According to an embodiment, the sixth lens 360 may be a plastic lens.

According to an embodiment, the image sensor 380 may output an image signal based on the light passing through the lens assembly 301. For example, the image sensor 380 is a semiconductor that converts the light obtained through the lens assembly 301 into a digital signal and may be a solid image sensor, such as a charge-coupled device (CCD) or a complementary metal-oxide semiconductor (CMOS). According to an embodiment, the image sensor 380 may be mounted in the camera module 300 or an electronic device (e.g., the electronic device 101 of FIG. 2).

According to an embodiment, the camera module 300 may include an optical filter 390. According to an embodiment, the optical filter 390 may be disposed between the lens assembly 301 and the image sensor 380. According to an embodiment, the optical filter 390 may include at least one of a low pass filter, an infrared (IR) cut filter, or a cover glass. According to an embodiment, the infrared cut filter may transmit wavelengths in the visible light band and reduce or block wavelengths in the infrared band. For example, if the optical filter 390 of the camera module 300 includes an infrared cut filter, light of the wavelengths in the infrared band transferred to the image sensor 380 may be reduced. According to an embodiment, the optical filter 390 may be excluded from the camera module 300.

Table 1 below shows the radius of curvature, thickness or air gap, effective diameter, refractive index, and Abbe number of the first lens 310, the second lens 320, the third lens 330, the fourth lens 340, the fifth lens 350, and the sixth lens 360. The configuration of the first lens 310, the second lens 320, the third lens 330, the fourth lens 340, the fifth lens 350, and the sixth lens 360, the optical filter 390, and the image sensor 380 may meet the conditions of Table 1.

According to an embodiment, the F-number of the lens assembly 301 of the camera module 300 and the composite focal length of the lens assembly 301 may be set to various values. According to an embodiment (e.g., the first embodiment), the F-number of the lens assembly 301 may be 1.8, the composite focal length of the lens assembly 301 may be 6.78 mm, the focal length of the first lens group 302 may be 5.96 mm, and the second focal length of the second lens group 304 may be −6.34 mm.

TABLE 1

|  | Radius of curvature | Thickness or air gap | Effective diameter | Refractive index | Abbe number |
| --- | --- | --- | --- | --- | --- |
| 310a | 2.920 | 0.967 | 1.990 | 1.544 | 56.09 |
| 310b | 13.031 | 0.130 | 1.791 |  |  |
| 320a | 6.875 | 0.260 | 1.656 | 1.671 | 19.23 |
| 320b | 4.166 | 0.858 | 1.522 |  |  |
| 330a | 39.187 | 0.260 | 1.646 | 1.614 | 25.95 |
| 330b | 14.318 | 0.266 | 1.829 |  |  |
| 340a | 12.868 | 0.468 | 2.095 | 1.567 | 37.4 |
| 340b | 13.852 | 0.663 | 2.274 |  |  |
| 350a | 33.481 | 0.785 | 2.611 | 1.544 | 56.09 |
| 350b | −4.204 | 0.000 | 2.851 |  |  |
| 360a | 8.101 | 0.517 | 4.431 | 1.544 | 56.09 |
| 360b | 2.371 | 0.194 | 5.089 |  |  |
| 390a | infinity | 0.110 | 5.529 | 1.517 | 64.2 |
| 390b | infinity |  | 5.566 |  |  |
| 380 | infinity | 0.010 | 6.003 |  |  |

In Table 1, '310a' and '310b' refer to the first surface and second surface, respectively, of the first lens 310, '320a' and '320b' refer to the third surface and fourth surface, respectively, of the second lens 320, '330a' and '330b' refer to the fifth surface and sixth surface, respectively, of the third lens 330, '340a' and '340b' refer to the seventh surface and eighth surface, respectively, of the fourth lens 340, '350a' and '350b' refer to the ninth surface and tenth surface, respectively, of the fifth lens 350, '360a' and '360b' refer to the eleventh surface and twelfth surface, respectively, of the sixth lens 360, '390a' and '390b' refer to the front surface and rear surface, respectively, of the optical filter 390, and '380' refers to the image surface of the image sensor 380. The unit of the radius of curvature, thickness, air gap and effective diameter in Table 1 is mm.

According to an embodiment, the lens assembly 301 may include at least one aspheric lens. For example, at least one of the first lens 310, the second lens 320, the third lens 330, the fourth lens 340, the fifth lens 350, or the sixth lens 360 may have at least one surface formed in an aspherical shape.

The shape of the aspheric lens may be obtained through Equation 1 below.

$$z = \frac{cY^2}{1 + \sqrt{1-(1+K)o^2Y^2}} + AY^4 + BY^4 + CY^4 + DY^4 + EY^4 + FY^4 + \ldots \quad \text{[Equation 1]}$$

In Equation 1, 'z' may mean the distance in the optical axis direction from the apex of the lens, 'Y' may mean the distance in the direction perpendicular to the optical axis of the lens, 'c' may mean the reciprocal (=1/R) of the radius of curvature at the apex of the lens, 'K' may mean the conic constant, and 'A', 'B', 'C', 'D', 'E', and 'F' may mean aspheric coefficients.

Table 2 below shows the respective aspheric coefficients of the first to sixth lenses 310, 320, 330, 340, 350, and 360. The first to sixth lenses 310, 320, 330, 340, 350, and 360 of the camera module 300 of the first embodiment (e.g., FIGS. 5 and 6) may meet the conditions of Table 2 below.

TABLE 2

|  | K | A | B | C | D | E | F |
|---|---|---|---|---|---|---|---|
| 310a | −0.1438 | −0.0215 | 0.1164 | −0.3509 | 0.6793 | −0.8914 | 0.8223 |
| 310b | 3.0320 | −0.0147 | 0.0380 | −0.1419 | 0.3655 | −0.6157 | 0.7075 |
| 320a | 1.3590 | −0.0170 | −0.0125 | 0.1075 | −0.2837 | 0.4471 | −0.4297 |
| 320b | 4.0473 | −0.0278 | 0.1258 | −0.6548 | 2.2380 | −5.1045 | 8.0944 |
| 330a | 40.4000 | 0.0045 | −0.1625 | 0.6748 | −1.8582 | 3.5158 | −4.7209 |
| 330b | 4.6411 | −0.0205 | 0.0262 | −0.1354 | 0.3747 | −0.6521 | 0.7638 |
| 340a | 1.9151 | −0.0145 | −0.0344 | 0.0917 | −0.1430 | 0.1505 | −0.1110 |
| 340b | 0.4420 | −0.0231 | −0.0090 | 0.0282 | −0.0460 | 0.0488 | −0.0352 |
| 350a | 0.0000 | −0.0029 | −0.0043 | −0.0035 | 0.0082 | −0.0070 | 0.0034 |
| 350b | 0.0000 | 0.0125 | −0.0266 | 0.0403 | −0.0422 | 0.0303 | −0.0151 |
| 360a | −0.2294 | −0.0956 | 0.0246 | −0.0073 | 0.0037 | −0.0014 | 0.0003 |
| 360b | −0.8649 | −0.1281 | 0.0716 | −0.0330 | 0.0103 | −0.0021 | 0.0003 |

In Table 2, '310a' and '310b' refer to the first surface and second surface, respectively, of the first lens 310, '320a' and '320b' refer to the third surface and fourth surface, respectively, of the second lens 320, '330a' and '330b' refer to the fifth surface and sixth surface, respectively, of the third lens 330, '340a' and '340b' refer to the seventh surface and eighth surface, respectively, of the fourth lens 340, '350a' and '350b' refer to the ninth surface and tenth surface, respectively, of the fifth lens 350, and '360a' and '360b' refer to the eleventh surface and twelfth surface, respectively, of the sixth lens 360.

According to an embodiment, the camera module 300 may include an aperture (not shown). According to an embodiment, the amount of light reaching the image sensor 380 may be adjusted by adjusting the size of the aperture. According to an embodiment, the aperture may be positioned between the first surface 310a of the first lens 310 and the sixth surface 330b of the third lens 330. For example, the aperture may be disposed on the fourth surface 320b of the second lens 320. As another example, the aperture may be disposed between the first lens 310 and the second lens 320 or between the second lens 320 and the third lens 330.

According to an embodiment, the second distance d2 between the first lens group 302 and the second lens group 304 may be changed. According to an embodiment, the second distance d2 may be an air gap between the tenth surface 350b of the fifth lens 350 and the eleventh surface 360a of the sixth lens 360. According to an embodiment, the second distance d2, which is a distance extended along the optical axis O between the first lens group 302 and the second lens group 304, may be changed based on the first distance d1 between the subject S and the electronic device (e.g., the electronic device 101 of FIG. 3). For example, the first distance d1 may be the distance between the outermost surface (not shown) of the camera module 300 and the subject S or the distance between the first surface 310a of the first lens 310 and the subject S. According to an embodiment, as the distance between the first lens group 302 and the second lens group 304 is changed, the image quality of the camera module 300 may be enhanced. For example, the curvature generated in the camera module 300 may be reduced. According to an embodiment, the effective diameter of the outermost surface of the camera module 300 may be 2.611 mm.

According to an embodiment, the third distance d3 between the lens assembly 301 (e.g., the second lens group 304) and the image sensor 380 may be changed. According to an embodiment, the third distance d3 may be an air gap between the twelfth surface 360b of the sixth lens 360 and the front surface of the image sensor 380. According to an embodiment, the third distance d3, which is the distance extended along the optical axis O of the lens assembly 301, may be changed based on the first distance d1 between the subject S and the electronic device (e.g., the electronic device 101 of FIG. 3). According to an embodiment, as the distance between the lens assembly 301 and the image sensor 380 is changed, the focus of the camera module 300 may be adjusted. For example, the camera module 300 of the electronic device (e.g., the electronic device 101 of FIG. 2) may perform an auto focusing (AF) function. According to an embodiment, the third distance d3 may be changed between 0.7500 mm and 1.0680 mm.

Table 3 below shows examples of the second distance d2 between the first lens group 302 and the second lens group 304 and the third distance d3 between the second lens group 304 and the image sensor 380 which are changed based on the first distance d1 between the subject S and the electronic device (e.g., the electronic device 101 of FIG. 3).

According to an embodiment, the second distance d2 may be changed based on the distance between the subject S and the camera module 300. According to an embodiment (e.g., a first state), in the first state in which the subject S is positioned sufficiently far away from the camera module 300 relative to the interval between the lenses 310, 320, 330, 340, 350, and 360 of the lens assembly 301, the second distance d2 may be 2.1020 mm. According to an embodiment (e.g., a second state or a third state), when capturing a relatively close subject S, the size of the second distance d2 may be reduced or increased as compared to when capturing a distant subject S. For example, when the first distance d1 is 2000 mm, the second distance d2 may be 2.1070 mm, and when the first distance d1 is 150 mm, the second distance d2 may be 2.0880 mm. According to an embodiment, the electronic device (e.g., the electronic device 101 of FIG. 2) may include at least one of a magnet, a motor, a gear structure, and a hydraulic structure. The processor (e.g., the processor 120 of FIG. 1) may move at least one of the first lens group 302 or the second lens group 304 using at least one of the magnet, the motor, the gear structure, or the hydraulic structure. For example, the processor 120 may adjust the second distance d2 between the first lens group 302 and the second lens group 304 and the third distance d3 between the lens assembly 301 and the image sensor 380 based on the first distance d1 between the subject S and the electronic device.

TABLE 3

| Distance | first state | second state | third state |
| --- | --- | --- | --- |
| first distance d1 | Infinity | 2000.0000 | 150.0000 |
| second distance d2 | 2.1020 | 2.1070 | 2.0880 |
| third distance d3 | 0.7500 | 0.7663 | 1.0680 |

According to an embodiment (e.g., FIG. 6), at least a portion of the camera module 300 may be received in the electronic device (e.g., the electronic device 101 of FIG. 2). According to an embodiment, when the camera module 300 is not used, the volume of the lens assembly 301 may be reduced. For example, the second distance d2 between the first lens group 302 and the second lens group 304 and the third distance d3 between the lens assembly 301 and the image sensor 380 may be reduced. The processor (e.g., the processor 120 of FIG. 1) of the electronic device (e.g., the electronic device 101 of FIG. 2) may generate a signal for moving the first lens group 302 and/or the second lens group 304 toward the interior of the electronic device 101.

Although FIG. 6 illustrates that at least a portion of the camera module 300 of the first embodiment (e.g., FIG. 5) is received in the electronic device 101, embodiments in which the volume of the lens assembly 301 is changed is not limited to the first embodiment. For example, in the second to sixth embodiments (e.g., FIGS. 7 to 11) described below, as the second distance d2 and/or the third distance d3 is changed, the volume of the lens assembly 301 may be reduced, and at least a portion of the camera module 300 may be received in the electronic device 101.

According to an embodiment, the first lens 310, the second lens 320, the third lens 330, the fourth lens 340, the fifth lens 350, and/or the sixth lens 360 of the lens assembly 301 may be formed in various different shapes. For example, in a portion adjacent to the optical axis O, the first surface 310a of the first lens 310 may be convex, and the second surface 310b may be concave. The third surface 320a of the second lens 320 may be convex, and the fourth surface 320b may be concave. The fifth surface 330a of the third lens 330 may be concave, and at least a portion (e.g., an edge area) of the sixth surface 330b may be convex and another portion (e.g., an area adjacent to the optical axis O or a central area) may be concave. At least a portion (e.g., an edge area) of the seventh surface 340a of the fourth lens 340 may be concave, and another portion (e.g., an area adjacent to the optical axis O or a central area) may be convex. At least a portion (e.g., an edge area) of the eighth surface 340b may be convex, and another portion (e.g., a portion adjacent to the optical axis O) may be concave. The ninth surface 350a of the fifth lens 350 may be concave, and the tenth surface 350b may be convex. At least a portion of the eleventh surface 360a of the sixth lens 360 may be concave. At least a portion (e.g., an edge area) of the twelfth surface 360b may be convex and another portion (e.g., an area adjacent to the optical axis O) may be concave.

According to an embodiment, the fifth lens 350 may include a ninth surface 350a facing the fourth lens 340 and a tenth surface 350b facing the sixth lens 360. The sixth lens 360 may include an eleventh surface 360a facing the fifth lens 350. At least a portion of the tenth surface 350b may be convex, and at least a portion of the eleventh surface 360a may be concave. According to an embodiment, the eleventh surface 360a may be concave to correspond to the convex shape of the tenth surface 350b. According to an embodiment, in a state in which at least a portion of the camera module 300 is received in the electronic device 101, the second distance d2 may be minimized because the curvature of the convex tenth surface 350b corresponds to the curvature of the concave eleventh surface 360a of the camera module 300.

Figure 7:
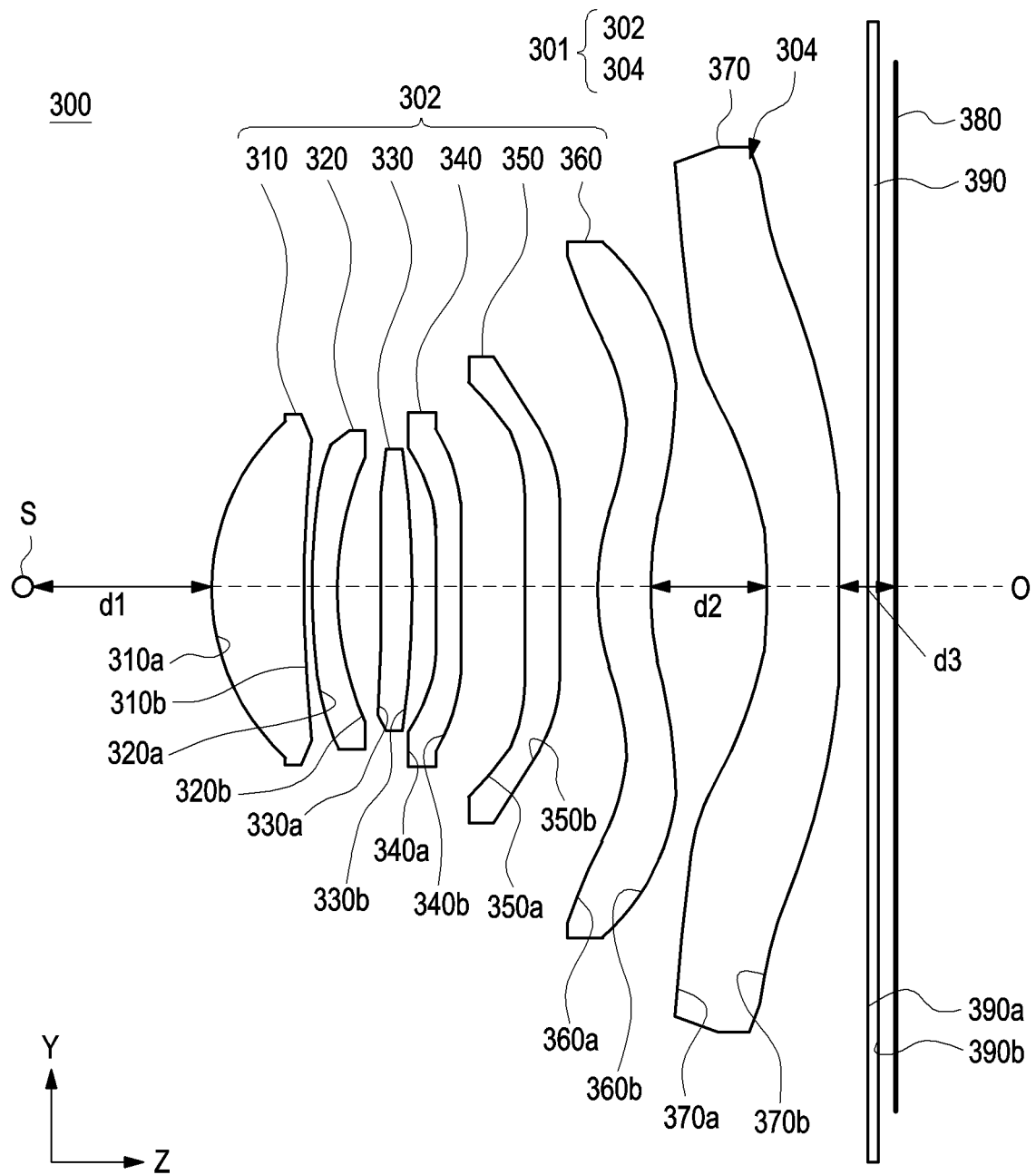
FIG. 7 is a view schematically illustrating a camera module according to second of various embodiments of the disclosure.

FIG. 7 is a view schematically illustrating a camera module according to one (e.g., a second embodiment) of various embodiments of the disclosure.

Referring to FIG. 7, the camera module 300 may include a lens assembly 301 that in turn includes a plurality of lenses, an image sensor 380, and an optical filter 390. The configuration of the camera module 300, the lens assembly 301, the image sensor 380, and the optical filter 390 of FIG. 7 may be identical in whole or part to the configuration of the camera module 300, the lens assembly 301, and the image sensor 380, and the optical filter 390 of FIG. 5.

According to an embodiment, the first lens group 302 may include a plurality of lenses. For example, the first lens group 302 may include a first lens 310, a second lens 320, a third lens 330, a fourth lens 340, a fifth lens 350, and a sixth lens 360. According to an embodiment, the first lens 310, the second lens 320, the third lens 330, the fourth lens 340, the fifth lens 350, and the sixth lens 360 may be sequentially arranged in a direction from the subject S to the image sensor 380 along the optical axis O. According to an embodiment, the first lens 310, the second lens 320, the third lens 330, the fourth lens 340, the fifth lens 350, and the sixth lens 360 each may be a plastic lens.

According to an embodiment, the first lens group 302 may have positive (+) composite refractive power. For example, the sum of the refractive powers of the first lens 310, the second lens 320, the third lens 330, the fourth lens 340, the fifth lens 350, and the sixth lens 360 is positive (+). If light parallel to the first lens group 302 is incident, the light passing through the first lens group 302 may be focused.

According to an embodiment, the second lens group 304 may include at least one lens. For example, the second lens group 304 may include a seventh lens 370. According to an embodiment, the seventh lens 370 may be a lens having negative (−) refractive power, and accordingly in this embodiment the second lens group 304 may have negative (−) composite refractive power. According to an embodiment, if light is incident on the second lens group 304, the light passing through the second lens group 304 may be scattered. According to an embodiment, the seventh lens 370 may be a plastic lens.

Table 4 below shows the radius of curvature, thickness or air gap, effective diameter, refractive index, and Abbe number of the first lens 310, the second lens 320, the third lens 330, the fourth lens 340, the fifth lens 350, the sixth lens 360, the seventh lens 370, and the optical filter 390, and the image sensor 380. The configuration of the first lens 310, the second lens 320, the third lens 330, the fourth lens 340, the fifth lens 350, the sixth lens 360, the seventh lens 370, the optical filter 390, and the image sensor 380 according to the second embodiment (e.g., FIG. 7) may meet the conditions of Table 4.

According to an embodiment, the F-number of the lens assembly 301 of the camera module 300 and the composite focal length of the lens assembly 301 may be set to various values. According to an embodiment (e.g., the second embodiment), the F-number of the lens assembly 301 may be 1.7, the composite focal length of the lens assembly 301 may be 6.44 mm, the focal length of the first lens group 302 may be 5.90 mm, and the second focal length of the second lens group 304 may be −9.82 mm.

TABLE 4

|  | Radius of curvature | Thickness or air gap | Effective diameter | Refractive index | Abbe number |
|---|---|---|---|---|---|
| 310a | 2.587 | 1.062 | 1.930 | 1.544 | 56.11 |
| 310b | 11.990 | 0.114 | 1.817 |  |  |
| 320a | 8.164 | 0.280 | 1.696 | 1.671 | 19.23 |
| 320b | 4.397 | 0.504 | 1.495 |  |  |
| 330a | 516.967 | 0.350 | 1.538 | 1.614 | 25.95 |
| 330b | −41.618 | 0.280 | 1.565 |  |  |
| 340a | 71.410 | 0.298 | 1.623 | 1.671 | 19.23 |
| 340b | 19.066 | 0.708 | 1.845 |  |  |
| 350a | 10.141 | 0.422 | 2.375 | 1.567 | 37.4 |
| 350b | 6.600 | 0.425 | 2.635 |  |  |
| 360a | 2.330 | 0.625 | 3.925 | 1.544 | 56.11 |
| 360b | 4.916 | d2 | 4.115 |  |  |
| 370a | −8.514 | 0.788 | 4.909 | 1.544 | 56.11 |
| 370b | 14.972 | 0.360 | 5.115 |  |  |

TABLE 4-continued

|  | Radius of curvature | Thickness or air gap | Effective diameter | Refractive index | Abbe number |
|---|---|---|---|---|---|
| 390a | infinity | 0.110 | 5.885 | 1.51680 | 64.2 |
| 390b | infinity | 0.146 | 5.921 |  |  |
| 380 | infinity |  | 6.00540 |  |  |

In Table 4, '310a' and '310b' refer to the first surface and second surface, respectively, of the first lens 310, '320a' and '320b' refer to the third surface and fourth surface, respectively, of the second lens 320, '330a' and '330b' refer to the fifth surface and sixth surface, respectively, of the third lens 330, '340a' and '340b' refer to the seventh surface and eighth surface, respectively, of the fourth lens 340, '350a' and '350b' refer to the ninth surface and tenth surface, respectively, of the fifth lens 350, '360a' and '360b' refer to the eleventh surface and twelfth surface, respectively, of the sixth lens 360, '370a' and '370b' refer to the thirteenth surface and fourteenth surface, respectively, of the seventh lens 370, '390a' and '390b' refer to the front surface and rear surface, respectively, of the optical filter 390, and '380' refers to the image surface of the image sensor 380. The unit of the radius of curvature, thickness, air gap and effective diameter in Table 4 may be mm.

According to an embodiment, the lens assembly 301 may include at least one aspheric lens. For example, at least one of the first lens 310, the second lens 320, the third lens 330, the fourth lens 340, the fifth lens 350, the sixth lens 360, or the seventh lens 370 may have at least one surface formed in an aspherical shape.

The shape of the aspheric lens may be obtained through Equation 1 above. Table 5 below shows the respective aspheric coefficients of the first to seventh lenses 310, 320, 330, 340, 350, 360, and 370. The first to seventh lenses 310, 320, 330, 340, 350, 360, and 370 of the camera module 300 of the first embodiment (e.g., FIG. 7) may meet the conditions of Table 5 below.

TABLE 5

|  | K | A | B | C | D | E | F |
|---|---|---|---|---|---|---|---|
| 310a | −0.98960 | 0.00972 | −0.02960 | 0.13113 | −0.32172 | 0.50972 | −0.55524 |
| 310b | 22.63200 | −0.02233 | 0.00814 | 0.06233 | −0.24820 | 0.52968 | −0.73615 |
| 320a | 17.78600 | −0.04229 | 0.06105 | −0.12191 | 0.26503 | −0.45772 | 0.59811 |
| 320b | 2.81870 | −0.01382 | −0.05517 | 0.45499 | −1.84950 | 5.05850 | −9.68950 |
| 330a | 59459.00000 | −0.05233 | 0.36055 | −1.98750 | 7.01840 | −16.74200 | 28.01100 |
| 330b | −15.40900 | −0.05019 | 0.19364 | −0.73407 | 1.85110 | −3.21850 | 3.99280 |
| 340a | −5.37380 | −0.02321 | −0.25799 | 1.33450 | −4.19630 | 8.90340 | −13.31300 |
| 340b | 73.56200 | −0.04512 | −0.02033 | 0.13813 | −0.37955 | 0.67722 | −0.84984 |
| 350a | 7.79600 | −0.06875 | 0.03820 | −0.01112 | −0.01137 | 0.02324 | −0.02394 |
| 350b | −97.41900 | −0.09576 | 0.04994 | −0.00040 | −0.04513 | 0.06274 | −0.04951 |
| 360a | −8.85630 | 0.01163 | −0.01220 | 0.00003 | 0.00321 | −0.00204 | 0.00071 |
| 360b | −20.18400 | 0.03508 | −0.02613 | 0.01153 | −0.00429 | 0.00130 | −0.00030 |
| 370a | −2.34754 | −0.04705 | 0.01198 | −0.00056 | −0.00059 | 0.00023 | −0.00004 |
| 370b | −12.05060 | −0.05240 | 0.03956 | −0.02193 | 0.00766 | −0.00174 | 0.00027 |

In Table 5, '310a' and '310b' refer to the first surface and second surface, respectively, of the first lens 310, '320a' and '320b' refer to the third surface and fourth surface, respectively, of the second lens 320, '330a' and '330b' refer to the fifth surface and sixth surface, respectively, of the third lens 330, '340a' and '340b' refer to the seventh surface and eighth surface, respectively, of the fourth lens 340, '350a' and '350b' refer to the ninth surface and tenth surface, respectively, of the fifth lens 350, '360a' and '360b' refer to the eleventh surface and twelfth surface, respectively, of the sixth lens 360, and '370a' and '370b' refer to the thirteenth surface and fourteenth surface, respectively, of the seventh lens 370.

According to an embodiment, the camera module 300 may include an aperture (not shown). According to an embodiment, the amount of light reaching the image sensor 380 may be adjusted by adjusting the size of the aperture. According to an embodiment, the aperture may be positioned between the first surface 310a of the first lens 310 and the sixth surface 330b of the third lens 330. For example, the aperture may be disposed on the fourth surface 320b of the second lens 320. As another example, the aperture may be disposed between the first lens 310 and the second lens 320 or between the second lens 320 and the third lens 330.

According to an embodiment, the second distance d2 between the first lens group 302 and the second lens group 304 may be changed. According to an embodiment, the second distance d2 may be an air gap between the twelfth surface 360b of the sixth lens 360 and the thirteenth surface 370a of the seventh lens 370. According to an embodiment, the second distance d2, which is a distance extended along the optical axis O between the first lens group 302 and the second lens group 304, may be changed based on the first distance d1 between the subject S and the electronic device (e.g., the electronic device 101 of FIG. 3). According to an embodiment, the first distance d1 may be the distance between the outermost surface (not shown) of the camera module 300 and the subject S or the distance between the first surface 310a of the first lens 310 and the subject S. According to an embodiment, as the distance between the first lens group 302 and the second lens group 304 is changed, the image quality of the camera module 300 may be enhanced. For example, the curvature generated in the camera module 300 may be reduced. According to an embodiment, the second distance d2 may be changed between 1.249 mm and 1.349 mm. According to an embodiment, the effective diameter of the outermost surface of the camera module 300 may be 2.626 mm.

According to an embodiment, the third distance d3 between the lens assembly 301 (e.g., the second lens group 304) and the image sensor 380 may be changed. According to an embodiment, the third distance d3 may be an air gap between the fourteenth surface 370b of the seventh lens 370 and the front surface of the image sensor 380. According to an embodiment, the third distance d3, which is the distance extended along the optical axis O of the lens assembly 301, may be changed based on the first distance d1 between the subject S and the electronic device (e.g., the electronic device 101 of FIG. 3). According to an embodiment, as the distance between the lens assembly 301 and the image sensor 380 is changed, the focus of the camera module 300 may be adjusted. For example, the camera module 300 of the electronic device (e.g., the electronic device 101 of FIG. 2) may perform an auto focusing (AF) function. According to an embodiment, the third distance d3 may be changed between 0.147 mm and 0.566 mm.

Table 6 below shows examples of the second distance d2 between the first lens group 302 and the second lens group 304 and the third distance d3 between the second lens group 304 and the image sensor 380 which are changed based on the first distance d1 between the subject S and the electronic device (e.g., the electronic device 101 of FIG. 3).

According to an embodiment, the second distance d2 may be changed based on the position of the subject S. According to an embodiment (e.g., a first state), in the first state in which the subject S is positioned far away from the camera module 300 relative to the interval between the lenses 310, 320, 330, 340, 350, 360, and 370 of the lens assembly 301, the second distance d2 may be 1.349 mm. According to an embodiment (e.g., a second state or a third state), when capturing a relatively close subject S, the size of the second distance d2 may be reduced or increased as compared to when capturing a distant subject S. For example, when the first distance d1 is 1000.000 mm, the second distance d2 may be 1.337 mm, and when the first distance d1 is 150.000 mm, the second distance d2 may be 1.249 mm.

TABLE 6

| Distance | first state | second state | third state |
| --- | --- | --- | --- |
| first distance d1 | Infinity | 1000.000 | 150.000 |
| second distance d2 | 1.349 | 1.337 | 1.249 |
| third distance d3 | 0.147 | 0.202 | 0.566 |

According to an embodiment, the first lens 310, the second lens 320, the third lens 330, the fourth lens 340, the fifth lens 350, the sixth lens 360, and/or the seventh lens 370 of the lens assembly 301 may be formed in various different shapes. For example, in an area adjacent to the optical axis O (e.g., a central area of the lens), the first surface 310a of the first lens 310 may be convex, and the second surface 310b may be concave. The third surface 320a of the second lens 320 may be convex, and the fourth surface 320b may be concave. The fifth surface 330a of the third lens 330 may be concave, and the sixth surface 330b may be convex. The seventh surface 340a of the fourth lens 340 may be concave, and the eighth surface 340b may be convex. At least a portion (e.g., an area adjacent to the optical axis O or a central area) of the ninth surface 350a of the fifth lens 350 may be concave, and the tenth surface 350b may be convex. At least a portion (e.g., an area adjacent to the optical axis O or a central area) of the eleventh surface 360a of the sixth lens 360 may be convex, and another portion (e.g., an edge area) may be concave. At least a portion (e.g., an area adjacent to the optical axis (O) or a central area) of the twelfth surface 360b may be concave, and another portion (e.g., an edge area) may be convex. At least a portion (e.g., an area adjacent to the optical axis O or a central area) of the thirteenth surface 370a may be concave, and another portion (e.g., an edge area) may be convex. The fourteenth surface 370b may be convex.

According to an embodiment, the sixth lens 360 may include an eleventh surface 360a facing the fifth lens 350 and a twelfth surface 360b facing the seventh lens 370. The seventh lens 370 may include a thirteenth surface 370a facing the sixth lens 360 and a fourteenth surface 370b facing the image sensor 380. In an area (e.g., a central area) adjacent to the optical axis O, at least a portion of the eleventh surface 360a may be convex, at least a portion of the twelfth surface 360b may be concave, at least a portion of the thirteenth surface 370a may be concave, and at least a portion of the fourteenth surface 370b may be convex.

According to an embodiment, the camera module 300 including the twelfth surface 360b having at least a concave portion and the thirteenth surface 370a having at least a concave portion may maintain the second distance d2 which is a predetermined length or more.

Figure 8:
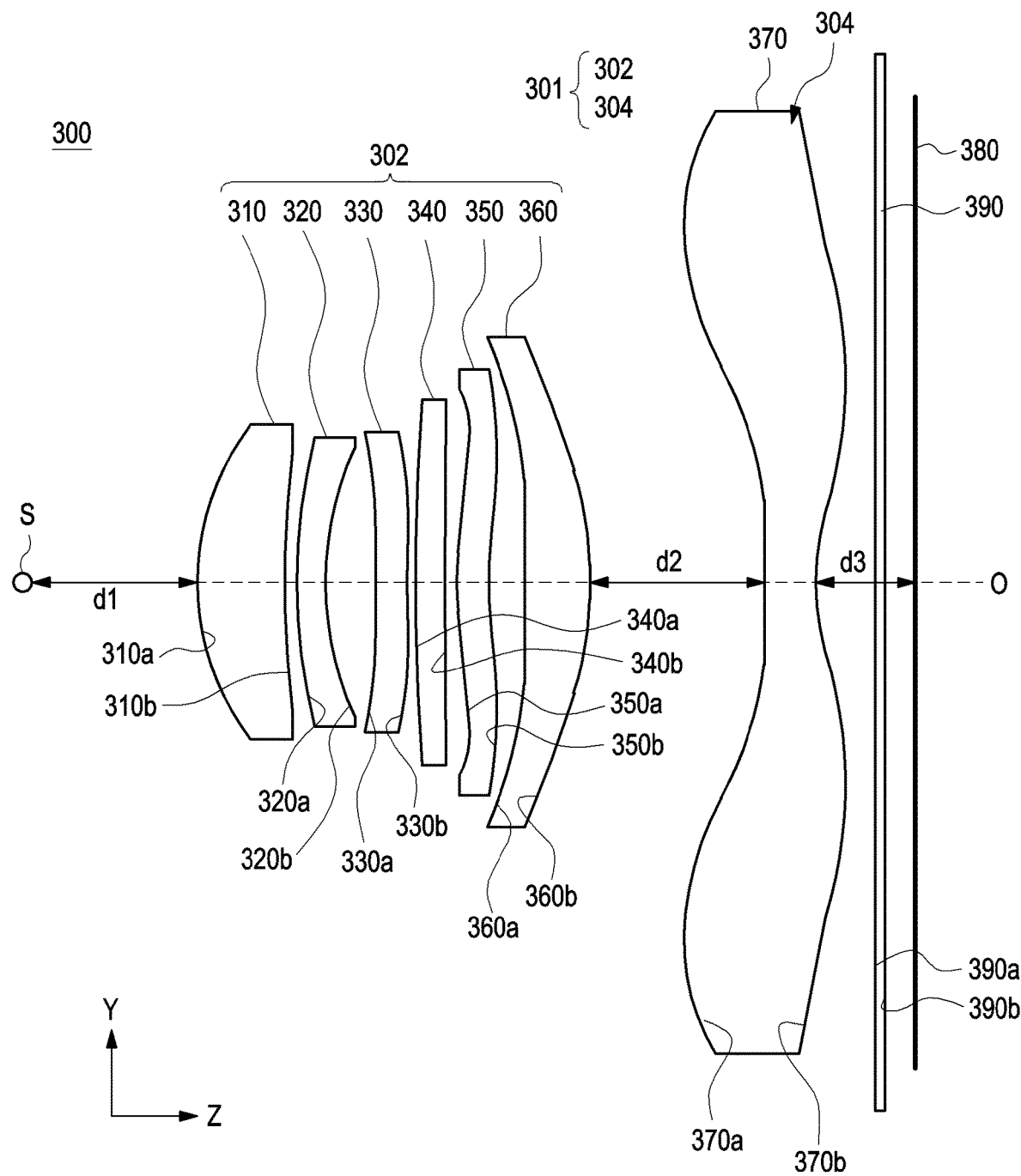
FIG. 8 is a view schematically illustrating a camera module according to third of various embodiments of the disclosure.

FIG. 8 is a view schematically illustrating a camera module according to one (e.g., a third embodiment) of various embodiments of the disclosure.

Referring to FIG. 8, the camera module 300 may include a lens assembly 301 that in turn includes a plurality of lenses, an image sensor 380, and an optical filter 390. The configuration of the camera module 300, the lens assembly 301, the image sensor 380, and the optical filter 390 of FIG. 8 may be identical in whole or part to the configuration of the camera module 300, the lens assembly 301, and the image sensor 380, and the optical filter 390 of FIG. 5.

According to an embodiment, the first lens group 302 may include a plurality of lenses. For example, the first lens group 302 may include a first lens 310, a second lens 320, a third lens 330, a fourth lens 340, a fifth lens 350, and a sixth lens 360. According to an embodiment, the first lens 310, the second lens 320, the third lens 330, the fourth lens 340, the fifth lens 350, and the sixth lens 360 may be sequentially arranged in a direction from the subject S to the image sensor 380 along the optical axis O. According to an embodiment, the first lens 310, the second lens 320, the third lens 330, the fourth lens 340, the fifth lens 350, and the sixth lens 360 each may be a plastic lens.

According to an embodiment, the first lens group 302 may have positive (+) composite refractive power. For example, the sum of the refractive powers of the first lens 310, the second lens 320, the third lens 330, the fourth lens 340, the fifth lens 350, and the sixth lens 360 is positive (+). If light parallel to the first lens group 302 is incident, the light passing through the first lens group 302 may be focused.

According to an embodiment, the second lens group 304 may include at least one lens. For example, the second lens group 304 may include a seventh lens 370. According to an embodiment, the seventh lens 370 may be lens having a negative (−) refractive power, and accordingly in this embodiment the second lens group 304 may have negative (−) composite refractive power. According to an embodiment, if light parallel to the second lens group 304 is incident, the light passing through the second lens group 304 may be scattered. According to an embodiment, the seventh lens 370 may be a plastic lens.

Table 7 below shows the radius of curvature, thickness or air gap, effective diameter, refractive index, and Abbe number of the first lens 310, the second lens 320, the third lens 330, the fourth lens 340, the fifth lens 350, the sixth lens 360, the seventh lens 370, and the optical filter 390, and the image sensor 380. The configuration of the first lens 310, the second lens 320, the third lens 330, the fourth lens 340, the fifth lens 350, the sixth lens 360, the seventh lens 370, the optical filter 390, and the image sensor 380 according to the second embodiment (e.g., FIG. 7) may meet the conditions of Table 7.

According to an embodiment, the F-number of the lens assembly 301 of the camera module 300 and the composite focal length of the lens assembly 301 may be set to various values. According to an embodiment, the F-number of the lens assembly 301 may be 1.8, the composite focal length of the lens assembly 301 may be 6.41 mm, the focal length of the first lens group 302 may be 5.82 mm, and the second focal length of the second lens group 304 may be −6.79 mm.

TABLE 7

|  | Radius of curvature | Thickness | Effective diameter | Refractive index | Abbe number |
|---|---|---|---|---|---|
| 310a | 2.918 | 0.966 | 1.820 | 1.544 | 56.09 |
| 310b | 14.210 | 0.112 | 1.671 |  |  |
| 320a | 7.308 | 0.323 | 1.601 | 1.671 | 19.23 |
| 320b | 4.109 | 0.658 | 1.503 |  |  |
| 330a | 13.514 | 0.320 | 1.606 | 1.614 | 25.95 |
| 330b | 9.464 | 0.100 | 1.817 |  |  |
| 340a | 31.581 | 0.354 | 2.058 | 1.567 | 37.4 |
| 340b | 27.955 | 0.122 | 2.144 |  |  |
| 350a | 6.258 | 0.343 | 2.243 | 1.567 | 37.4 |
| 350b | 5.902 | 0.401 | 2.456 |  |  |
| 360a | 17.853 | 0.878 | 2.550 | 1.544 | 56.09 |
| 360b | −4.435 | d2 | 2.831 |  |  |
| 370a | 7.743 | 0.553 | 4.498 | 1.544 | 56.09 |
| 370b | 2.445 | 0.350 | 5.185 |  |  |
| 390a | infinity | 0.110 | 5.645 | 1.51680 | 64.2 |
| 390b | infinity |  | 5.687 |  |  |
| 380 | infinity | 0.042 | 6.002 |  |  |

In Table 7, '310a' and '310b' refer to the first surface and second surface, respectively, of the first lens 310, '320a' and '320b' refer to the third surface and fourth surface, respectively, of the second lens 320, '330a' and '330b' refer to the fifth surface and sixth surface, respectively, of the third lens 330, '340a' and '340b' refer to the seventh surface and eighth surface, respectively, of the fourth lens 340, '350a' and '350b' refer to the ninth surface and tenth surface, respectively, of the fifth lens 350, '360a' and '360b' refer to the eleventh surface and twelfth surface, respectively, of the sixth lens 360, '370a' and '370b' refer to the thirteenth surface and fourteenth surface, respectively, of the seventh lens 370, '390a' and '390b' refer to the front surface and rear surface, respectively, of the optical filter 390, and '380' refers to the image surface of the image sensor 380. The unit of the radius of curvature, thickness, air gap and effective diameter in Table 7 may be mm.

According to an embodiment, the lens assembly 301 may include at least one aspheric lens. For example, at least one of the first lens 310, the second lens 320, the third lens 330, the fourth lens 340, the fifth lens 350, the sixth lens 360, or the seventh lens 370 may have at least one surface formed in an aspherical shape.

The shape of the aspheric lens may be obtained through Equation 1 above. Table 8 below shows the respective aspheric coefficients of the first to seventh lenses 310, 320, 330, 340, 350, 360, and 370. The first to seventh lenses 310, 320, 330, 340, 350, 360, and 370 of the camera module 300 of the third embodiment (e.g., FIG. 8) may meet the conditions of Table 8 below.

TABLE 8

|  | K | A | B | C | D | E | F |
|---|---|---|---|---|---|---|---|
| 310a | −0.1403 | −0.0012 | 0.0101 | −0.0210 | 0.0241 | −0.0163 | 0.0067 |
| 310b | 0.0000 | −0.0023 | −0.0320 | 0.0811 | −0.1037 | 0.0790 | −0.0370 |
| 320a | 1.7403 | −0.0162 | 0.0286 | −0.1253 | 0.3554 | −0.5963 | 0.6413 |
| 320b | 3.9763 | −0.0239 | 0.1471 | −0.8977 | 3.4359 | −8.7586 | 15.5360 |
| 330a | −1.0000 | −0.0360 | 0.1933 | −1.0451 | 3.3478 | −7.1319 | 10.6060 |
| 330b | 0.0000 | −0.0136 | 0.0903 | −0.4407 | 1.0348 | −1.5544 | 1.6080 |
| 340a | 0.0000 | 0.0269 | −0.0477 | 0.0067 | 0.0814 | −0.1575 | 0.1634 |
| 340b | −4984.7000 | 0.0886 | −0.3587 | 0.7571 | −1.0429 | 0.9991 | −0.6888 |
| 350a | 0.0000 | 0.0361 | −0.2228 | 0.3918 | −0.4080 | 0.2793 | −0.1290 |
| 350b | 0.0000 | 0.0043 | −0.0973 | 0.1635 | −0.1764 | 0.1341 | −0.0730 |
| 360a | 0.0000 | 0.0098 | −0.0361 | 0.0408 | −0.0355 | 0.0216 | −0.0089 |
| 360b | 0.0000 | 0.0221 | −0.0475 | 0.0690 | −0.0673 | 0.0444 | −0.0204 |

TABLE 8-continued

| | K | A | B | C | D | E | F |
|---|---|---|---|---|---|---|---|
| 370a | 0.1141 | −0.0834 | 0.0161 | 0.0000 | −0.0008 | 0.0002 | 0.0000 |
| 370b | −0.8608 | −0.1038 | 0.0580 | −0.0268 | 0.0081 | −0.0016 | 0.0002 |

In Table 8, '310a' and '310b' refer to the first surface and second surface, respectively, of the first lens 310, '320a' and '320b' refer to the third surface and fourth surface, respectively, of the second lens 320, '330a' and '330b' refer to the fifth surface and sixth surface, respectively, of the third lens 330, '340a' and '340b' refer to the seventh surface and eighth surface, respectively, of the fourth lens 340, '350a' and '350b' refer to the ninth surface and tenth surface, respectively, of the fifth lens 350, '360a' and '360b' refer to the eleventh surface and twelfth surface, respectively, of the sixth lens 360, and '370a' and '370b' refer to the thirteenth surface and fourteenth surface, respectively, of the seventh lens 370.

According to an embodiment, the camera module 300 may include an aperture (not shown). According to an embodiment, the amount of light reaching the image sensor 380 may be adjusted by adjusting the size of the aperture. According to an embodiment, the aperture may be positioned between the first surface 310a of the first lens 310 and the sixth surface 330b of the third lens 330. For example, the aperture may be disposed on the second surface 310b of the first lens 310. As another example, the aperture may be disposed between the first lens 310 and the second lens 320 or between the second lens 320 and the third lens 330.

According to an embodiment, the second distance d2 between the first lens group 302 and the second lens group 304 may be changed. According to an embodiment, the second distance d2 may be an air gap between the twelfth surface 360b of the sixth lens 360 and the thirteenth surface 370a of the seventh lens 370. According to an embodiment, the second distance d2, which is a distance extended along the optical axis O between the first lens group 302 and the second lens group 304, may be changed based on the first distance d1 between the subject S and the electronic device (e.g., the electronic device 101 of FIG. 3). According to an embodiment, the first distance d1 may be the distance between the outermost surface (not shown) of the camera module 300 and the subject S or the distance between the first surface 310a of the first lens 310 and the subject S. According to an embodiment, as the distance between the first lens group 302 and the second lens group 304 is changed, the image quality of the camera module 300 may be enhanced. For example, the curvature generated in the camera module 300 may be reduced. According to an embodiment, the effective diameter of the outermost surface of the camera module 300 may be 1.877 mm.

According to an embodiment, the third distance d3 between the lens assembly 301 (e.g., the second lens group 304) and the image sensor 380 may be changed. According to an embodiment, the third distance d3 may be an air gap between the twelfth surface 360b of the sixth lens 360 and the front surface of the image sensor 380. According to an embodiment, the third distance d3, which is the distance extended along the optical axis O of the lens assembly 301, may be changed based on the first distance d1 between the subject S and the electronic device (e.g., the electronic device 101 of FIG. 3). According to an embodiment, as the distance between the lens assembly 301 and the image sensor 380 is changed, the focus of the camera module 300 may be adjusted. For example, the camera module 300 of the electronic device (e.g., the electronic device 101 of FIG. 2) may perform an auto focusing (AF) function. According to an embodiment, the third distance d3 may be changed between 0.440 mm and 0.674 mm.

Table 9 below shows examples of the second distance d2 between the first lens group 302 and the second lens group 304 and the third distance d3 between the second lens group 304 and the image sensor 380 which are changed based on the first distance d1 between the subject S and the electronic device (e.g., the electronic device 101 of FIG. 3).

According to an embodiment, the second distance d2 may be changed based on the position of the subject S. According to an embodiment (e.g., a first state), in the first state in which the subject S is positioned far away from the camera module 300 relative to the interval between the lenses 310, 320, 330, 340, 350, and 360 of the lens assembly 301, the second distance d2 may be 2.122 mm. According to an embodiment (e.g., a second state or a third state), when capturing a relatively close subject S, the size of the second distance d2 may be reduced or increased as compared to when capturing a distant subject S. For example, when the first distance d1 is 2000 mm, the second distance d2 may be 2.124 mm, and when the first distance d1 is 200 mm, the second distance d2 may be 2.108 mm.

TABLE 9

| Distance | first state | second state | third state |
|---|---|---|---|
| first distance d1 | Infinity | 2000.000 | 200.000 |
| second distance d2 | 2.122 | 2.124 | 2.108 |
| third distance d3 | 0.440 | 0.458 | 0.674 |

According to an embodiment, the first lens 310, the second lens 320, the third lens 330, the fourth lens 340, the fifth lens 350, the sixth lens 360, and/or the seventh lens 370 of the lens assembly 301 may be formed in various different shapes. For example, in an area adjacent to the optical axis O (e.g., a central area of the lens), the first surface 310a of the first lens 310 may be convex, and the second surface 310b may be concave. The third surface 320a of the second lens 320 may be convex, and the fourth surface 320b may be concave. The fifth surface 330a of the third lens 330 may be concave, and the sixth surface 330b may be convex. The seventh surface 340a of the fourth lens 340 may be convex, and the eighth surface 340b may be convex. At least a portion (e.g., an area adjacent to the optical axis O or a central area) of the ninth surface 350a of the fifth lens 350 may be convex, and another portion (e.g., an edge area) may be concave. At least a portion (e.g., an area adjacent to the optical axis O or a central area) of the tenth surface 350b of the fifth lens 350 may be concave, and another portion (e.g., an edge area) may be convex. The eleventh surface 360a of the sixth lens 360 may be concave, and the twelfth surface 360b may be convex. At least a portion (e.g., an area adjacent to the optical axis O or a central area) of the thirteenth surface 370a of the seventh lens 370 may be concave, and another portion (e.g., an edge area) may be convex. At least a portion (e.g., an area adjacent to the optical axis O or a central area) of the fourteenth surface 370b of the seventh lens 370 may be concave, and another portion (e.g., an edge area) may be convex.

According to an embodiment, the sixth lens 360 may include an eleventh surface 360a facing the fifth lens 350 and a twelfth surface 360b facing the seventh lens 370. The seventh lens 370 may include a thirteenth surface 370a facing the sixth lens 360 and a fourteenth surface 370b facing the image sensor 380. At least a portion of the eleventh surface 360a may be concave, at least a portion of the twelfth surface 360b may be convex, at least a portion of the thirteenth surface 370a may be concave, and at least a portion of the fourteenth surface 370b may be concave. According to an embodiment, in a state in which at least a portion of the camera module 300 is received in the electronic device 101, the second distance d2 may be minimized because the curvature of the convex twelfth surface 360b corresponds to the curvature of the concave thirteenth surface 370a of the camera module 300.

Figure 9:
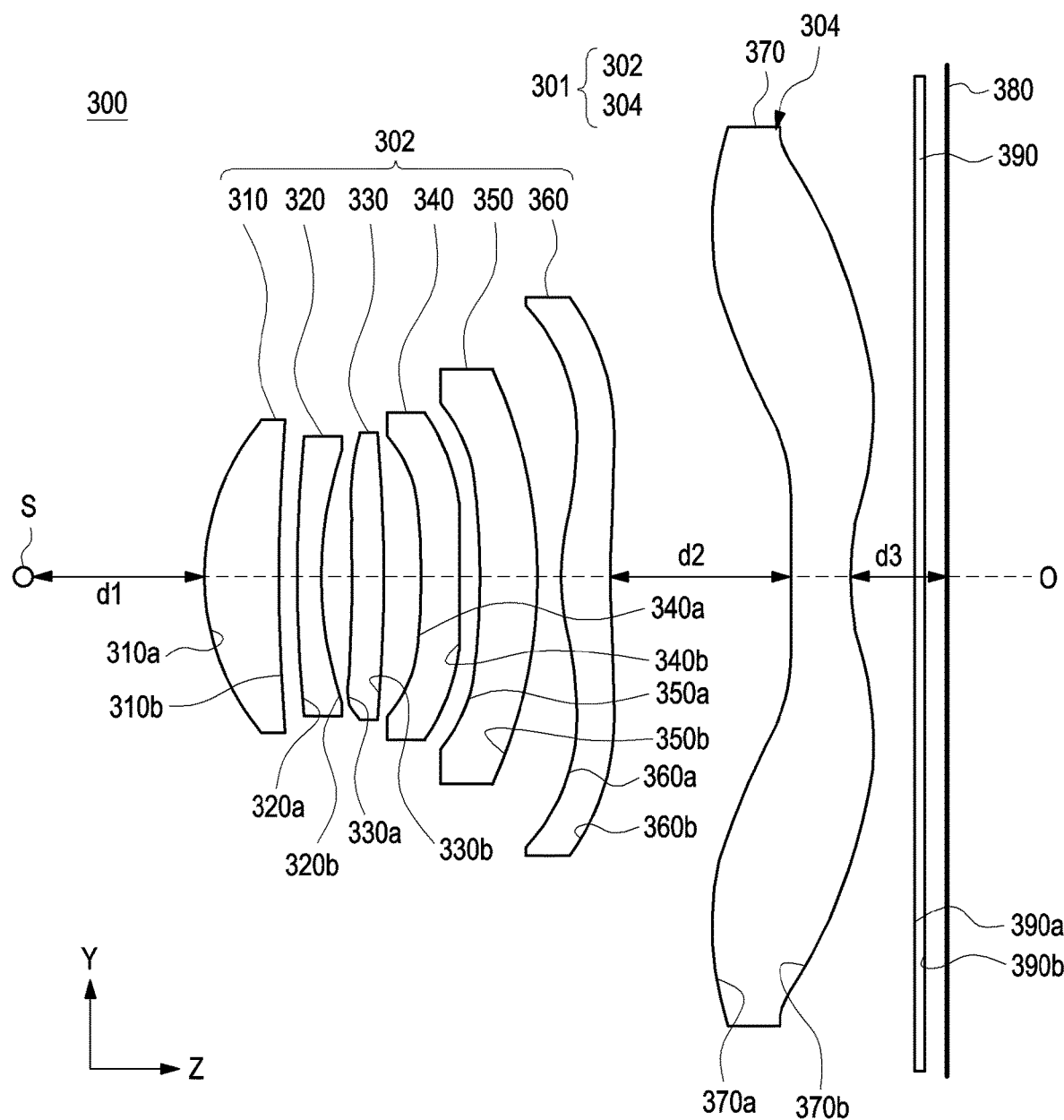
FIG. 9 is a view schematically illustrating a camera module according to fourth of various embodiments of the disclosure.

FIG. 9 is a view schematically illustrating a camera module according to one (e.g., a fourth embodiment) of various embodiments of the disclosure.

Referring to FIG. 9, the camera module 300 may include a lens assembly 301 that in turn includes a plurality of lenses, an image sensor 380, and an optical filter 390. The configuration of the camera module 300, the lens assembly 301, the image sensor 380, and the optical filter 390 of FIG. 9 may be identical in whole or part to the configuration of the camera module 300, the lens assembly 301, and the image sensor 380, and the optical filter 390 of FIG. 8.

Table 10 below shows the radius of curvature, thickness or air gap, effective diameter, refractive index, and Abbe's number of the first lens 310, the second lens 320, the third lens 330, the fourth lens 340, the fifth lens 350, the sixth lens 360, the seventh lens 370, and the optical filter 390, and the image sensor 380. The configuration of the first lens 310, the second lens 320, the third lens 330, the fourth lens 340, the fifth lens 350, the sixth lens 360, the seventh lens 370, the optical filter 390, and the image sensor 380 according to the second embodiment (e.g., FIG. 7) may meet the conditions of Table 10.

According to an embodiment, the F-number of the lens assembly 301 of the camera module 300 and the composite focal length of the lens assembly 301 may be set to various values. According to an embodiment (e.g., the fourth embodiment), the F-number of the lens assembly 301 may be 2.0, the composite focal length of the lens assembly 301 may be 6.78 mm, the focal length of the first lens group 302 may be 6.29 mm, and the second focal length of the second lens group 304 may be -9.64 mm.

TABLE 10

| | Radius of curvature | Thickness or air gap | Effective diameter | Refractive index | Abbe number |
|---|---|---|---|---|---|
| 310a | 2.600 | 0.847 | 1.735 | 1.544 | 56.09 |
| 310b | 10.893 | 0.250 | 1.643 | | |
| 320a | 12.602 | 0.280 | 1.539 | 1.671 | 19.23 |
| 320b | 5.802 | 0.386 | 1.463 | | |
| 330a | 26.624 | 0.441 | 1.480 | 1.544 | 56.09 |
| 330b | -119.159 | 0.279 | 1.576 | | |
| 340a | -13.194 | 0.346 | 1.589 | 1.671 | 19.23 |
| 340b | 39.180 | 0.188 | 1.816 | | |
| 350a | -35.397 | 0.536 | 1.923 | 1.639 | 23.51 |
| 350b | -19.814 | 0.287 | 2.270 | | |
| 360a | 4.032 | 0.393 | 2.799 | 1.535 | 55.71 |
| 360b | 16.731 | d2 | 3.096 | | |
| 370a | 5.427 | 0.509 | 4.753 | 1.544 | 56.09 |
| 370b | 2.584 | 0.250 | 4.955 | | |
| 390a | infinity | 0.110 | 5.361 | 1.51680 | 64.2 |
| 390b | infinity | | 5.389 | | |
| 380 | infinity | 0.010 | 5.703 | | |

In Table 10, '310a' and '310b' refer to the first surface and second surface, respectively, of the first lens 310, '320a' and '320b' refer to the third surface and fourth surface, respectively, of the second lens 320, '330a' and '330b' refer to the fifth surface and sixth surface, respectively, of the third lens 330, '340a' and '340b' refer to the seventh surface and eighth surface, respectively, of the fourth lens 340, '350a' and '350b' refer to the ninth surface and tenth surface, respectively, of the fifth lens 350, '360a' and '360b' refer to the eleventh surface and twelfth surface, respectively, of the sixth lens 360, '370a' and '370b' refer to the thirteenth surface and fourteenth surface, respectively, of the seventh lens 370, '390a' and '390b' refer to the front surface and rear surface, respectively, of the optical filter 390, and '380' refers to the image surface of the image sensor 380. The unit of the radius of curvature, thickness, air gap and effective diameter in Table 10 may be mm. According to an embodiment, the lens assembly 301 may include at least one aspheric lens. For example, at least one of the first lens 310, the second lens 320, the third lens 330, the fourth lens 340, the fifth lens 350, the sixth lens 360, or the seventh lens 370 may have at least one surface formed in an aspherical shape.

The shape of the aspheric lens may be obtained through Equation 1 above. Table 11 below shows the respective aspheric coefficients of the first to seventh lenses 310, 320, 330, 340, 350, 360, and 370. The first to seventh lenses 310, 320, 330, 340, 350, 360, and 370 of the camera module 300 of the fourth embodiment (e.g., FIG. 9) may meet the conditions of Table 11 below.

TABLE 11

| | K | A | B | C | D | E | F |
|---|---|---|---|---|---|---|---|
| 310a | -0.5660 | 0.0189 | -0.1100 | 0.4621 | -1.2212 | 2.1753 | -2.7155 |
| 310b | -0.5297 | -0.0151 | 0.0847 | -0.4143 | 1.3002 | -2.6958 | 3.8446 |
| 320a | 10.4380 | -0.0066 | -0.0346 | 0.2038 | -0.4717 | 0.4861 | 0.2115 |
| 320b | 0.4756 | -0.0087 | 0.0144 | -0.0321 | 0.1524 | -0.3445 | 0.2774 |
| 330a | 64.6980 | -0.0094 | -0.0488 | 0.1981 | -0.4760 | 0.4862 | 0.5760 |
| 330b | -2.8142E+52 | -0.0206 | 0.1049 | -0.5954 | 1.8234 | -3.5192 | 4.4885 |
| 340a | 28.0350 | -0.0367 | 0.1729 | -1.0354 | 3.5493 | -8.1310 | 13.1270 |
| 340b | 0.0000 | -0.0315 | 0.1528 | -0.9128 | 2.7462 | -5.1445 | 6.5124 |
| 350a | -13630.0000 | -0.0479 | 0.1525 | -0.6778 | 1.7657 | -2.8854 | 3.1751 |
| 350b | 44.7480 | -0.0375 | -0.0120 | 0.0089 | 0.0559 | -0.1168 | 0.1165 |
| 360a | -36.0060 | 0.0453 | -0.0957 | 0.1239 | -0.1104 | 0.0664 | -0.0278 |
| 360b | 9.3947 | 0.0064 | -0.0093 | 0.0118 | -0.0120 | 0.0070 | -0.0026 |
| 370a | -28.7400 | -0.0622 | -0.0067 | 0.0143 | -0.0061 | 0.0015 | -0.0002 |
| 370b | -4.8031 | 0.0203 | -0.0674 | 0.0376 | -0.0113 | 0.0022 | -0.0003 |

In Table 11, '310a' and '310b' refer to the first surface and second surface, respectively, of the first lens 310, '320a' and '320b' refer to the third surface and fourth surface, respectively, of the second lens 320, '330a' and '330b' refer to the fifth surface and sixth surface, respectively, of the third lens 330, '340a' and '340b' refer to the seventh surface and eighth surface, respectively, of the fourth lens 340, '350a' and '350b' refer to the ninth surface and tenth surface, respectively, of the fifth lens 350, '360a' and '360b' refer to the eleventh surface and twelfth surface, respectively, of the sixth lens 360, and '370a' and '370b' refer to the thirteenth surface and fourteenth surface, respectively, of the seventh lens 370. According to an embodiment, the camera module 300 may include an aperture (not shown). According to an embodiment, the amount of light reaching the image sensor 380 may be adjusted by adjusting the size of the aperture. According to an embodiment, the aperture may be positioned between the first surface 310a of the first lens 310 and the sixth surface 330b of the third lens 330. For example, the aperture may be disposed on the third surface 320a of the second lens 320. As another example, the aperture may be disposed between the first lens 310 and the second lens 320 or between the second lens 320 and the third lens 330.

According to an embodiment, the second distance d2 between the first lens group 302 and the second lens group 304 may be changed. According to an embodiment, the second distance d2 may be an air gap between the twelfth surface 360b of the sixth lens 360 and the thirteenth surface 370a of the seventh lens 370. According to an embodiment, the second distance d2, which is a distance extended along the optical axis O between the first lens group 302 and the second lens group 304, may be changed based on the first distance d1 between the subject S and the electronic device (e.g., the electronic device 101 of FIG. 3). According to an embodiment, the first distance d1 may be the distance between the outermost surface (not shown) of the camera module 300 and the subject S or the distance between the first surface 310a of the first lens 310 and the subject S. According to an embodiment, as the distance between the first lens group 302 and the second lens group 304 is changed, the image quality of the camera module 300 may be enhanced. For example, the curvature generated in the camera module 300 may be reduced. According to an embodiment, the effective diameter of the outermost surface of the camera module 300 may be 2.269 mm.

According to an embodiment, the third distance d3 between the lens assembly 301 (e.g., the second lens group 304) and the image sensor 380 may be changed. According to an embodiment, the third distance d3 may be an air gap between the twelfth surface 360b of the sixth lens 360 and the front surface of the image sensor 380. According to an embodiment, the third distance d3, which is the distance extended along the optical axis O of the lens assembly 301, may be changed based on the first distance d1 between the subject S and the electronic device (e.g., the electronic device 101 of FIG. 3). According to an embodiment, as the distance between the lens assembly 301 and the image sensor 380 is changed, the focus of the camera module 300 may be adjusted. For example, the camera module 300 of the electronic device (e.g., the electronic device 101 of FIG. 2) may perform an auto focusing (AF) function. According to an embodiment, the third distance d3 may be changed between 0.750 mm and 1.022 mm.

Table 12 below shows examples of the second distance d2 between the first lens group 302 and the second lens group 304 and the third distance d3 between the second lens group 304 and the image sensor 380 which are changed based on the first distance d1 between the subject S and the electronic device (e.g., the electronic device 101 of FIG. 3).

According to an embodiment, the second distance d2 may be changed based on the position of the subject S. According to an embodiment (e.g., a first state), in the first state in which the subject S is positioned far away from the camera module 300 relative to the interval between the lenses 310, 320, 330, 340, 350, and 360 of the lens assembly 301, the second distance d2 may be 2.101 mm. According to an embodiment (e.g., a second state or a third state), when capturing a relatively close subject S, the size of the second distance d2 may be reduced or increased as compared to when capturing a distant subject S. For example, when the first distance d1 is 1000 mm, the second distance d2 may be 2.102 mm, and when the first distance d1 is 200 mm, the second distance d2 may be 1.022 mm.

TABLE 12

| Distance | first state | second state | third state |
| --- | --- | --- | --- |
| first distance d1 | Infinity | 1000.000 | 200.000 |
| second distance d2 | 2.101 | 2.102 | 2.077 |
| third distance d3 | 0.750 | 0.796 | 1.022 |

According to an embodiment, the first lens 310, the second lens 320, the third lens 330, the fourth lens 340, the fifth lens 350, the sixth lens 360, and/or the seventh lens 370 of the lens assembly 301 may be formed in various different shapes. For example, in an area adjacent to the optical axis O (e.g., a central area), the first surface 310a of the first lens 310 may be convex, and the second surface 310b may be concave. The third surface 320a of the second lens 320 may be convex, and the fourth surface 320b may be concave. The fifth surface 330a and the sixth surface 330b of the third lens 330 may be convex or substantially flat. The seventh surface 340a of the fourth lens 340 may be concave, and the eighth surface 340b may be convex. The ninth surface 350a of the fifth lens 350 may be concave, and the tenth surface 350b may be convex. At least a portion (e.g., an area adjacent to the optical axis O or a central area) of the eleventh surface 360a of the sixth lens 360 may be convex, and another portion (e.g., an edge area) may be concave. At least a portion (e.g., an area adjacent to the optical axis O or a central area) of the twelfth surface 360b of the sixth lens 360 may be concave, and another portion (e.g., an edge area) may be convex. At least a portion (e.g., an area adjacent to the optical axis O or a central area) of the thirteenth surface 370a of the seventh lens 370 may be concave, and another portion (e.g., an edge area) may be convex. At least a portion (e.g., an area adjacent to the optical axis O or a central area) of the fourteenth surface 370b of the seventh lens 370 may be concave, and another portion (e.g., an edge area) may be convex.

According to an embodiment, the sixth lens 360 may include an eleventh surface 360a facing the fifth lens 350 and a twelfth surface 360b facing the seventh lens 370. The seventh lens 370 may include a thirteenth surface 370a facing the sixth lens 360 and a fourteenth surface 370b facing the image sensor 380. At least a portion of the eleventh surface 360a may be convex, and at least a portion of the twelfth surface 360b, at least a portion of the thirteenth surface 370a, and at least a portion of the fourteenth surface 370b may be concave.

Figure 10:
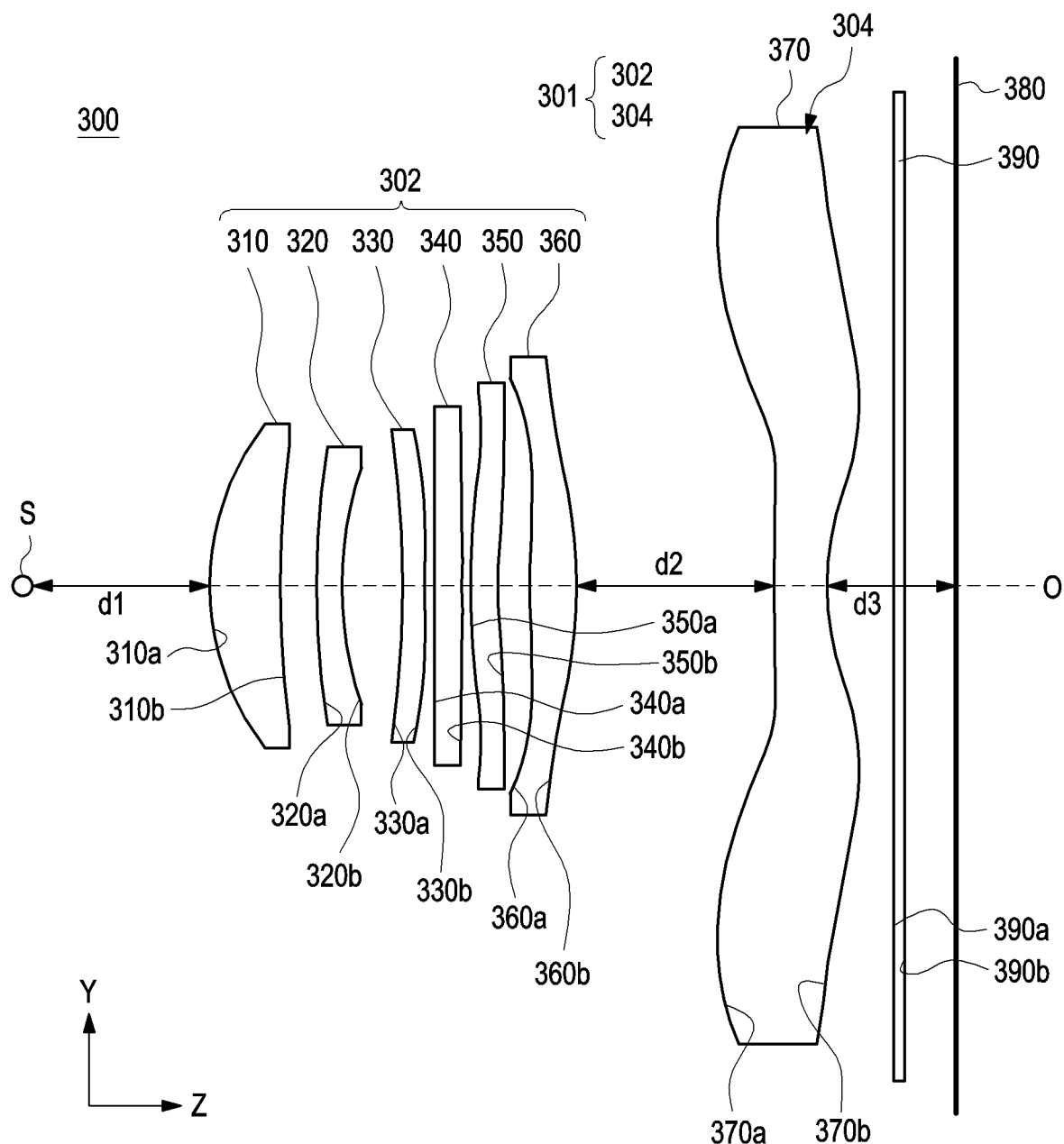
FIG. 10 is a view schematically illustrating a camera module according to fifth of various embodiments of the disclosure.

FIG. 10 is a view schematically illustrating a camera module according to one (e.g., a fifth embodiment) of various embodiments of the disclosure.

Referring to FIG. 10, the camera module 300 may include a lens assembly 301 that in turn includes a plurality of lenses, an image sensor 380, and an optical filter 390. The configuration of the camera module 300, the lens assembly 301, the image sensor 380, and the optical filter 390 of FIG. 9 may be identical in whole or part to the configuration of the camera module 300, the lens assembly 301, and the image sensor 380, and the optical filter 390 of FIG. 9.

Table 13 below shows the radius of curvature, thickness or air gap, effective diameter, refractive index, and Abbe's number of the first lens 310, the second lens 320, the third lens 330, the fourth lens 340, the fifth lens 350, the sixth lens 360, the seventh lens 370, and the optical filter 390, and the image sensor 380. The configuration of the first lens 310, the second lens 320, the third lens 330, the fourth lens 340, the fifth lens 350, the sixth lens 360, the seventh lens 370, the optical filter 390, and the image sensor 380 according to the second embodiment (e.g., FIG. 7) may meet the conditions of Table 13.

According to an embodiment, the F-number of the lens assembly 301 of the camera module 300 and the composite focal length of the lens assembly 301 may be set to various values. According to an embodiment (e.g., the fifth embodiment), the F-number of the lens assembly 301 may be 1.9, the composite focal length of the lens assembly 301 may be 6.55 mm, the focal length of the first lens group 302 may be 5.92 mm, and the second focal length of the second lens group 304 may be −6.33 mm.

TABLE 13

| | Radius of curvature | Thickness or air gap | Effective diameter | Refractive index | Abbe number |
|---|---|---|---|---|---|
| 310a | 3.021 | 0.703 | 1.752 | 1.566 | 63.51 |
| 310b | 17.787 | 0.356 | 1.627 | | |
| 320a | 7.863 | 0.338 | 1.496 | 1.671 | 19.23 |
| 320b | 4.172 | 0.664 | 1.394 | | |
| 330a | 26.984 | 0.361 | 1.542 | 1.614 | 25.95 |
| 330b | 21.997 | 0.100 | 1.686 | | |
| 340a | 182.597 | 0.278 | 1.871 | 1.567 | 37.4 |
| 340b | 27.074 | 0.100 | 1.959 | | |
| 350a | 6.502 | 0.286 | 2.087 | 1.567 | 37.4 |
| 350b | 6.745 | 0.375 | 2.203 | | |

TABLE 13-continued

| | Radius of curvature | Thickness or air gap | Effective diameter | Refractive index | Abbe number |
|---|---|---|---|---|---|
| 360a | 39.267 | 0.506 | 2.266 | 1.544 | 56.09 |
| 360b | −4.571 | d2 | 2.487 | | |
| 370a | 7.151 | 0.680 | 4.447 | 1.544 | 56.09 |
| 370b | 2.254 | 0.714 | 5.102 | | |
| 390a | infinity | 0.110 | 5.544 | 1.51680 | 64.2 |
| 390b | infinity | | 5.583 | | |
| 380 | infinity | 0.087 | 5.703 | | |

In Table 13, '310a' and '310b' refer to the first surface and second surface, respectively, of the first lens 310, '320a' and '320b' refer to the third surface and fourth surface, respectively, of the second lens 320, '330a' and '330b' refer to the fifth surface and sixth surface, respectively, of the third lens 330, '340a' and '340b' refer to the seventh surface and eighth surface, respectively, of the fourth lens 340, '350a' and '350b' refer to the ninth surface and tenth surface, respectively, of the fifth lens 350, '360a' and '360b' refer to the eleventh surface and twelfth surface, respectively, of the sixth lens 360, '370a' and '370b' refer to the thirteenth surface and fourteenth surface, respectively, of the seventh lens 370, '390a' and '390b' refer to the front surface and rear surface, respectively, of the optical filter 390, and '380' refers to the image surface of the image sensor 380. The unit of the radius of curvature, thickness, air gap and effective diameter in Table 13 may be mm.

According to an embodiment, the lens assembly 301 may include at least one aspheric lens. For example, at least one of the second lens 320, the third lens 330, the fourth lens 340, the fifth lens 350, the sixth lens 360, or the seventh lens 370 may have at least one surface formed in an aspherical shape.

The shape of the aspheric lens may be obtained through Equation 1 above. Table 14 below shows the respective aspheric coefficients of the second to seventh lenses 320, 330, 340, 350, 360, and 370. The second to seventh lenses 320, 330, 340, 350, 360, and 370 of the camera module 300 of the fifth embodiment (e.g., FIG. 10) may meet the conditions of Table 14 below. According to an embodiment, the first lens 310 may be a spherical lens.

TABLE 14

| | K | A | B | C | D | E | F |
|---|---|---|---|---|---|---|---|
| 320a | 4.3405E+00 | −8.7666E−03 | 3.9630E−02 | −1.8157E−01 | 5.2832E−01 | −1.0148E+00 | 1.3426E+00 |
| 320b | 3.8520E+00 | 9.9286E−03 | −2.4737E−01 | 1.6993E+00 | −6.9523E+00 | 1.8535E+01 | −3.3914E+01 |
| 330a | −1.0000E+00 | −5.8829E−02 | 3.7507E−01 | −1.7793E+00 | 5.1302E+00 | −9.8912E+00 | 1.3366E+01 |
| 330b | 0.0000E+00 | −4.3470E−04 | 2.2749E−02 | −2.2636E−01 | 4.8717E−01 | −54643E−01 | 3.5160E−01 |
| 340a | 0.0000E+00 | 2.8929E−02 | 8.9926E−03 | −2.5632E−01 | 5.8393E−01 | −6.9758E−01 | 5.3126E−01 |
| 340b | −3.1217E+03 | 4.8076E−02 | −1.5174E−01 | 2.9678E−01 | −4.3298E−01 | 4.5380E−01 | −3.3739E−01 |
| 350a | 0.0000E+00 | 2.4647E−02 | −2.1228E−01 | 4.3383E−01 | −4.9612E−01 | 3.5925E−01 | −1.7293E−01 |
| 350b | 0.0000E+00 | 2.9490E−02 | −2.1720E−01 | 3.6938E−01 | −3.5415E−01 | 2.1852E−01 | −9.1867E−02 |
| 360a | 0.0000E+00 | 3.5657E−02 | −8.6591E−02 | 5.8107E−02 | −1.0837E−02 | −8.4015E−03 | 6.6564E−03 |
| 360b | 0.0000E+00 | 3.6990E−02 | −5.5467E−02 | 5.1163E−02 | −4.1982E−02 | 3.0551E−02 | −1.6562E−02 |
| 370a | 7.7086E−02 | −2.2542E−02 | −2.8360E−02 | 1.6339E−02 | −4.2803E−03 | 6.8336E−04 | −7.2919E−05 |
| 370b | −8.7467E−01 | −1.4229E−01 | 1.1882E−01 | −6.2271E−02 | 1.9288E−02 | −3.8239E−03 | 5.1417E−04 |

In Table 14, '310a' and '310b' refer to the first surface and second surface, respectively, of the first lens 310, '320a' and '320b' refer to the third surface and fourth surface, respectively, of the second lens 320, '330a' and '330b' refer to the fifth surface and sixth surface, respectively, of the third lens 330, '340a' and '340b' refer to the seventh surface and eighth surface, respectively, of the fourth lens 340, '350a' and '350b' refer to the ninth surface and tenth surface, respectively, of the fifth lens 350, '360a' and '360b' refer to the eleventh surface and twelfth surface, respectively, of the sixth lens 360, and '370a' and '370b' refer to the thirteenth surface and fourteenth surface, respectively, of the seventh lens 370.

According to an embodiment, the camera module 300 may include an aperture (not shown). According to an embodiment, the amount of light reaching the image sensor 380 may be adjusted by adjusting the size of the aperture. According to an embodiment, the aperture may be positioned between the first surface 310a of the first lens 310 and the sixth surface 330b of the third lens 330. For example, the aperture may be disposed on the fourth surface 320b of the second lens 320. As another example, the aperture may be disposed between the first lens 310 and the second lens 320 or between the second lens 320 and the third lens 330.

According to an embodiment, the second distance d2 between the first lens group 302 and the second lens group 304 may be changed. According to an embodiment, the second distance d2 may be an air gap between the twelfth surface 360b of the sixth lens 360 and the thirteenth surface 370a of the seventh lens 370. According to an embodiment, the second distance d2, which is a distance extended along the optical axis O between the first lens group 302 and the second lens group 304, may be changed based on the first distance d1 between the subject S and the electronic device (e.g., the electronic device 101 of FIG. 3). According to an embodiment, the first distance d1 may be the distance between the outermost surface (not shown) of the camera module 300 and the subject S or the distance between the first surface 310a of the first lens 310 and the subject S. According to an embodiment, as the distance between the first lens group 302 and the second lens group 304 is changed, the image quality of the camera module 300 may be enhanced. For example, the curvature generated in the camera module 300 may be reduced. According to an embodiment, the second distance d2 may be changed between 2.234 mm and 2.199 mm. According to an embodiment, the effective diameter of the outermost surface of the camera module 300 may be 1.780 mm.

According to an embodiment, the third distance d3 between the lens assembly 301 (e.g., the second lens group 304) and the image sensor 380 may be changed. According to an embodiment, the third distance d3 may be an air gap between the twelfth surface 360b of the sixth lens 360 and the front surface of the image sensor 380. According to an embodiment, the third distance d3, which is the distance extended along the optical axis O of the lens assembly 301, may be changed based on the first distance d1 between the subject S and the electronic device (e.g., the electronic device 101 of FIG. 3). According to an embodiment, as the distance between the lens assembly 301 and the image sensor 380 is changed, the focus of the camera module 300 may be adjusted. For example, the camera module 300 of the electronic device (e.g., the electronic device 101 of FIG. 2) may perform an auto focusing (AF) function. According to an embodiment, the third distance d3 may be changed between 0.1115 mm and 0.2930 mm.

Table 15 below shows examples of the second distance d2 between the first lens group 302 and the second lens group 304 and the third distance d3 between the second lens group 304 and the image sensor 380 which are changed based on the first distance d1 between the subject S and the electronic device (e.g., the electronic device 101 of FIG. 3).

According to an embodiment, the second distance d2 may be changed based on the position of the subject S. According to an embodiment (e.g., a first state), in the first state in which the subject S is positioned far away from the camera module 300 relative to the interval between the lenses 310, 320, 330, 340, 350, and 360 of the lens assembly 301, the second distance d2 may be 2.199 mm. According to an embodiment (e.g., a second state or a third state), when capturing a relatively close subject S, the size of the second distance d2 may be reduced or increased as compared to when capturing a distant subject S. For example, when the first distance d1 is 1000 mm, the second distance d2 may be 2.206 mm, and when the first distance d1 is 200 mm, the second distance d2 may be 2.234 mm.

TABLE 15

| Distance | first state | second state | third state |
|---|---|---|---|
| first distance d1 | Infinity | 1000.000 | 200.000 |
| second distance d2 | 2.199 | 2.206 | 2.234 |
| third distance d3 | 0.1115 | 0.1461 | 0.2930 |

According to an embodiment, the first lens 310, the second lens 320, the third lens 330, the fourth lens 340, the fifth lens 350, the sixth lens 360, and/or the seventh lens 370 of the lens assembly 301 may be formed in various different shapes. For example, in a portion adjacent to the optical axis O (e.g., a central area), the first surface 310a of the first lens 310 may be convex, and the second surface 310b may be concave. The third surface 320a of the second lens 320 may be convex, and the fourth surface 320b may be concave. The fifth surface 330a of the third lens 330 may be concave, and the sixth surface 330b may be convex. The seventh surface 340a of the fourth lens 340 may be convex, and the eighth surface 340b may be convex. The ninth surface 350a of the fifth lens 350 may be convex, and the tenth surface 350b may be concave. At least a portion (e.g., an area adjacent to the optical axis O or a central area) of the eleventh surface 360a of the sixth lens 360 may be convex, and another portion (e.g., an edge area) may be concave. At least a portion of the twelfth surface 360b of the sixth lens 360 may be convex. At least a portion (e.g., an area adjacent to the optical axis O or a central area) of the thirteenth surface 370a of the seventh lens 370 may be concave, and another portion (e.g., an edge area) may be convex. At least a portion (e.g., an area adjacent to the optical axis O or a central area) of the fourteenth surface 370b of the seventh lens 370 may be concave, and another portion (e.g., an edge area) may be convex.

According to an embodiment, the sixth lens 360 may include an eleventh surface 360a facing the fifth lens 350 and a twelfth surface 360b facing the seventh lens 370. The seventh lens 370 may include a thirteenth surface 370a facing the sixth lens 360 and a fourteenth surface 370b facing the image sensor 380. At least a portion of the eleventh surface 360a and at least a portion of the twelfth surface 360b may be convex, and at least a portion of the thirteenth surface 370a and at least a portion of the fourteenth surface 370b may be concave. According to an embodiment, in a state in which at least a portion of the camera module 300 is received in the electronic device 101, the second distance d2 may be minimized because the curvature of the convex twelfth surface 360b corresponds to the curvature of the concave thirteenth surface 370a of the camera module 300.

Figure 11:
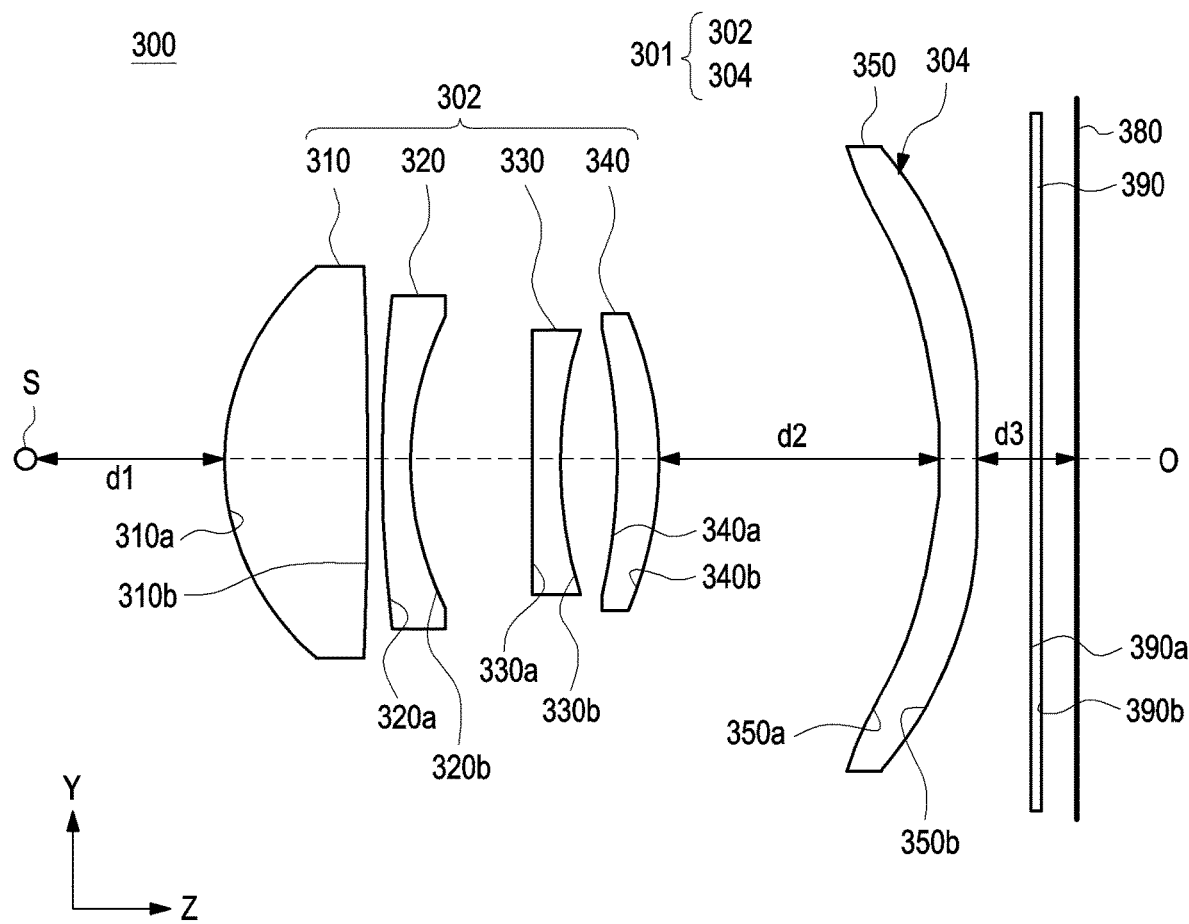
FIG. 11 is a view schematically illustrating a camera module according to sixth of various embodiments of the disclosure.

FIG. 11 is a view schematically illustrating a camera module according to one (e.g., a sixth embodiment) of various embodiments of the disclosure.

Referring to FIG. 11, the camera module 300 may include a lens assembly 301 that in turn includes a plurality of lenses, an image sensor 380, and an optical filter 390. The configuration of the camera module 300, the lens assembly 301, the image sensor 380, and the optical filter 390 of FIG. 11 may be identical in whole or part to the configuration of the camera module 300 of FIG. 4.

According to an embodiment, the first lens group 302 may include a plurality of lenses. For example, the first lens group 302 may include a first lens 310, a second lens 320, a third lens 330, and a fourth lens 340. According to an embodiment, the first lens 310, the second lens 320, the third lens 330, and the fourth lens 340 may be sequentially arranged in a direction from the subject S to the image sensor 380 along the optical axis O. According to an embodiment, the first lens 310, the second lens 320, the third lens 330, and/or the fourth lens 340 may be a plastic lens.

According to an embodiment, the first lens group 302 may have positive (+) composite refractive power. For example, the sum of the refractive powers of the first lens 310, the second lens 320, the third lens 330, and the fourth lens 340 is positive (+). If light parallel to the first lens group 302 is incident, the light passing through the first lens group 302 may be focused.

According to an embodiment, the first surface 310a facing the subject S of the first lens 310 may be convex. For example, the first lens 310 may be a meniscus lens in which the first surface 310a is convex. As another example, the first lens 310 may include a convex first surface 310a and a convex second surface 310b.

According to an embodiment, the second lens group 304 may include at least one lens. For example, the second lens group 304 may include a fifth lens 350. According to an embodiment, the fifth lens 350 may be lens having a negative (−) refractive power, and accordingly in this embodiment the second lens group 304 may have negative (−) composite refractive power. According to an embodiment, if light parallel to the second lens group 304 is incident, the light passing through the second lens group 304 may be scattered. According to an embodiment, the fifth lens 360 may be a plastic lens.

Table 16 below shows the radius of curvature, thickness or air gap, effective diameter, refractive index, and Abbe number of the first lens 310, the second lens 320, the third lens 330, the fourth lens 340, the fifth lens 350, the optical filter 390, and the image sensor 380. The configuration of the first lens 310, the second lens 320, the third lens 330, the fourth lens 340, the fifth lens 350, and the sixth lens 360, the optical filter 390, and the image sensor 380 according to the sixth embodiment (e.g., FIG. 11) may meet the conditions of Table 16.

According to an embodiment, the F-number of the lens assembly 301 of the camera module 300 and the composite focal length of the lens assembly 301 may be set to various values. According to an embodiment (e.g., the sixth embodiment), the F-number of the lens assembly 301 may be 2.4, the composite focal length of the lens assembly 301 may be 8.55 mm, the focal length of the first lens group 302 may be 7.95 mm, and the second focal length of the second lens group 304 may be −10.82 mm.

TABLE 16

|  | Radius of curvature | Thickness or air gap | Effective diameter | Refractive index | Abbe number |
|---|---|---|---|---|---|
| 310a | 2.289 | 1.177 | 1.809 | 1.53480 | 55.71 |
| 310b | −15.026 | 0.107 | 1.648 |  |  |
| 320a | 15.038 | 0.283 | 1.500 | 1.67074 | 19.23 |
| 320b | 3.735 | 0.782 | 1.341 |  |  |
| 330a | −66.201 | 0.280 | 1.227 | 1.54410 | 56.09 |
| 330b | 4.002 | 0.235 | 1.210 |  |  |
| 340a | −25.636 | 0.392 | 1.258 | 1.67074 | 19.23 |
| 340b | −6.617 | 0.000 | 1.398 |  |  |
| 350a | −4.855 | 0.304 | 2.387 | 1.54410 | 56.09 |
| 350b | −27.676 | 0.400 | 2.572 |  |  |
| 390a | infinity | 0.110 | 2.992 | 1.5168 | 64.2 |
| 390b | infinity |  | 3.016 |  |  |
| 380 | infinity | 0.002 | 3.051 |  |  |

In Table 16, '310a' and '310b' refer to the first surface and second surface, respectively, of the first lens 310, '320a' and '320b' refer to the third surface and fourth surface, respectively, of the second lens 320, '330a' and '330b' refer to the fifth surface and sixth surface, respectively, of the third lens 330, '340a' and '340b' refer to the seventh surface and eighth surface, respectively, of the fourth lens 340, '350a' and '350b' refer to the ninth surface and tenth surface, respectively, of the fifth lens 350, and '390a' and '390b' refer to the front surface and rear surface of the optical filter 390, and '380' refers to the image surface of the image sensor 380. The unit of the radius of curvature, thickness, air gap and effective diameter in Table 16 may be mm.

According to an embodiment, the lens assembly 301 may include at least one aspheric lens. For example, at least one of the first lens 310, the second lens 320, the third lens 330, the fourth lens 340, or the fifth lens 350 may have at least one surface formed in an aspherical shape.

The shape of the aspheric lens may be obtained through Equation 1 above. Table 17 below shows the respective aspheric coefficients of the first to fifth lenses 310, 320, 330, 340, and 350. The first to fifth lenses 310, 320, 330, 340, and 350 of the camera module 300 of the sixth embodiment (e.g., FIG. 11) may meet the conditions of Table 17 below.

TABLE 17

|  | K | A | B | C | D | E | F |
|---|---|---|---|---|---|---|---|
| 310a | −0.3495 | 0.0037 | 0.0000 | 0.0009 | −0.0007 | 0.0003 | −0.0001 |
| 310b | −61.3700 | 0.0066 | −0.0016 | 0.0043 | −0.0052 | 0.0027 | −0.0007 |
| 320a | 44.4200 | −0.0085 | 0.0022 | 0.0175 | −0.0224 | 0.0129 | −0.0036 |
| 320b | −30.8200 | 0.0669 | −0.0636 | 0.0898 | −0.0810 | 0.0454 | −0.0138 |
| 330a | −7404.0000 | −0.0226 | 0.0488 | −0.0480 | 0.0122 | 0.0701 | −0.1289 |
| 330b | −10.4400 | −0.0090 | 0.0727 | −0.1640 | 0.3434 | −0.4843 | 0.4390 |
| 340a | 228.4000 | −0.0504 | −0.0558 | 0.2448 | −0.5529 | 0.6967 | −0.5163 |
| 340b | 6.2060 | −0.0308 | −0.0369 | 0.1151 | −0.1951 | 0.1839 | −0.1009 |

TABLE 17-continued

| | K | A | B | C | D | E | F |
|---|---|---|---|---|---|---|---|
| 350a | 0.2156 | −0.0638 | 0.0880 | −0.0783 | 0.0431 | −0.0149 | 0.0032 |
| 350b | −723.3000 | −0.1015 | 0.1234 | −0.1030 | 0.0523 | −0.0166 | 0.0033 |

In Table 17, '310a' and '310b' refer to the first surface and second surface, respectively, of the first lens 310, '320a' and '320b' refer to the third surface and fourth surface, respectively, of the second lens 320, '330a' and '330b' refer to the fifth surface and sixth surface, respectively, of the third lens 330, '340a' and '340b' refer to the seventh surface and eighth surface, respectively, of the fourth lens 340, and '350a' and '350b' refer to the ninth surface and tenth surface, respectively, of the fifth lens 350. According to an embodiment, the camera module 300 may include an aperture (not shown). According to an embodiment, the amount of light reaching the image sensor 380 may be adjusted by adjusting the size of the aperture. According to an embodiment, the aperture may be positioned in front of the first surface 310a of the first lens 310. For example, the aperture may form at least a portion of the outermost surface (not shown) of the camera module 300. As another example, the aperture may be positioned between the first surface 310a of the first lens 310 and the sixth surface 330b of the third lens 330.

According to an embodiment, the second distance d2 between the first lens group 302 and the second lens group 304 may be changed. According to an embodiment, the second distance d2 may be an air gap between the eighth surface 340b of the fourth lens 340 and the ninth surface 350a of the fifth lens 350. According to an embodiment, the second distance d2, which is a distance extended along the optical axis O between the first lens group 302 and the second lens group 304, may be changed based on the first distance d1 between the subject S and the electronic device (e.g., the electronic device 101 of FIG. 3). According to an embodiment, the first distance d1 may be the distance between the outermost surface (not shown) of the camera module 300 and the subject S, the distance between the first surface 310a of the first lens 310 and the subject S, or the distance between the aperture (not shown) and the subject S. According to an embodiment, as the distance between the first lens group 302 and the second lens group 304 is changed, the image quality of the camera module 300 may be enhanced. For example, the curvature generated in the camera module 300 may be reduced. According to an embodiment, the second distance d2 may be changed between 2.662 mm and 2.698 mm. According to an embodiment, the effective diameter of the aperture may be 1.758 mm.

According to an embodiment, the third distance d3 between the lens assembly 301 (e.g., the second lens group 304) and the image sensor 380 may be changed. According to an embodiment, the third distance d3 may be an air gap between the tenth surface 350b of the fifth lens 350 and the front surface of the image sensor 380. According to an embodiment, the third distance d3, which is the distance extended along the optical axis O of the lens assembly 301, may be changed based on the first distance d1 between the subject S and the electronic device (e.g., the electronic device 101 of FIG. 3). According to an embodiment, as the distance between the lens assembly 301 and the image sensor 380 is changed, the focus of the camera module 300 may be adjusted. For example, the camera module 300 of the electronic device (e.g., the electronic device 101 of FIG. 2) may perform an auto focusing (AF) function. According to an embodiment, the third distance d3 may be changed between 0.1003 mm and 0.1857 mm.

Table 18 below shows examples of the second distance d2 between the first lens group 302 and the second lens group 304 and the third distance d3 between the second lens group 304 and the image sensor 380 which are changed based on the first distance d1 between the subject S and the electronic device (e.g., the electronic device 101 of FIG. 3).

According to an embodiment, the second distance d2 may be changed based on the position of the subject S. According to an embodiment (e.g., a first state), in the first state in which the subject S is positioned far away from the camera module 300 relative to the interval between the lenses 310, 320, 330, 340, and 350 of the lens assembly 301, the second distance d2 may be 2.662 mm. According to an embodiment (e.g., a second state or a third state), when capturing a relatively close subject S, the size of the second distance d2 may be reduced or increased as compared to when capturing a distant subject S. For example, when the first distance d1 is 3000.000 mm, the second distance d2 may be 2.669 mm, and when the first distance d1 is 400 mm, the second distance d2 may be 2.698 mm.

TABLE 18

| Distance | first state | second state | third state |
|---|---|---|---|
| first distance d1 | Infinity | 3000.000 | 400.000 |
| second distance d2 | 2.662 | 2.669 | 2.698 |
| third distance d3 | 0.1003 | 0.1185 | 0.1857 |

According to an embodiment, the first lens 310, the second lens 320, the third lens 330, the fourth lens 340, and/or the fifth lens 350 of the lens assembly 301 may be formed in various different shapes. For example, in a portion adjacent to the optical axis O, the first surface 310a and second surface 310b of the first lens 310 may be convex. The third surface 320a of the second lens 320 may be convex, and the fourth surface 320b may be concave. The fifth surface 330a of the third lens 330 may be substantially flat, and the sixth surface 330b may be concave. The seventh surface 340a of the fourth lens 340 may be concave, and the eighth surface 340b may be convex. The ninth surface 350a of the fifth lens 350 may be concave, and the tenth surface 350b may be convex. According to an embodiment, the fourth lens 340 may include the seventh surface 340a facing the third lens 330 and the eighth surface 340b facing the fifth lens 350, and the fifth lens 350 may include the ninth surface 350a facing the fourth lens 340 and the tenth surface 350b facing the image sensor 380. At least a portion of the seventh surface 340a may be concave, at least a portion of the eighth surface 340b may be convex, and at least a portion of the ninth surface 350a may be concave. According to an embodiment, the ninth surface 350a may be concave to correspond to the convex shape of the eighth surface 340b. According to an embodiment, in a state in which at least a portion of the camera module 300 is received in the electronic device 101, the second distance d2 may be minimized because the curvature of the convex eighth surface 340b corresponds to the curvature of the concave ninth surface 350a of the camera module 300.

According to an embodiment, the lens assembly 301 may be substantially a monofocal lens. For example, the lens assembly 301 may meet Equation 2 below.

$$\left(1 - \left(\frac{FOV_{FINITY}}{FOV_{INFINITY}}\right)\right) * 100 < 10 \qquad [\text{Equation 2}]$$

where $FOV_{FINITY}$ refers to the angle of view at a finite distance of the lens assembly, and $FOV_{INFINITY}$ refers to the angle of view at the infinite distance of the lens assembly.

Table 19 below shows the angle of view at the finite distance and the angle of view at the infinite distance of the lens assembly 301 according to the first to sixth embodiments (e.g., FIGS. 5 and 7 to 11). The configuration of the lens assembly 301 according to the first to sixth embodiments (e.g., FIGS. 5 and 7 to 11) may meet the conditions of Equation 2 and Table 19. According to an embodiment, $FOV_{d2(FINITY)}$ may refer to the angle of view at the second distance d2 of the lens assembly 301, and $FOV_{d3(FINITY)}$ may refer to the angle of view at the third distance d3 of the lens assembly 301. The unit of the angle of view in Table 19 is degrees) (°).

TABLE 19

| | $FOV_{INFINITY}$ | $FOV_{d2(FINITY)}$ | $FOV_{d3(FINITY)}$ | $\left(1 - \left(\frac{(FOV_{FINITY})}{(FOV_{INFINITY})}\right)\right) * 100$ |
|---|---|---|---|---|
| First embodiment | 79 | 79 | 77 | 2.4 |
| Second embodiment | 80 | 80 | 77 | 4.3 |
| Third embodiment | 81 | 81 | 79 | 2.2 |
| Fourth embodiment | 78 | 78 | 76 | 2.5 |
| Fifth embodiment | 76 | 76 | 74 | 2.5 |
| Sixth embodiment | 39 | 39 | 38 | 1.1 |

In the lens assembly 301, according to various different embodiments of the disclosure (e.g., FIGS. 5 to 11), the size of the refractive power of the second lens group 304 may be smaller than the size of the refractive power of a certain lens (e.g., the first lens 310, the second lens 320, the third lens 330, the fourth lens 340, or the fifth lens 350 of FIG. 5) of the first lens group 302, and the Abbe number of the lens group 304 may be larger than the Abbe number of a certain lens of the lenses of the first lens group 302.

In the lens assembly 301 according to various different embodiments of the disclosure (e.g., FIGS. 5 to 11), the thickness of the lens, the size of the lens, or the shape of the lens are slightly exaggerated for the detailed description of the present invention. In particular, the shape of the spherical or aspherical surface of the lens illustrated in FIGS. 5 to 11 is provided as an example only and the disclosure is not limited thereto.

Figure 12A:
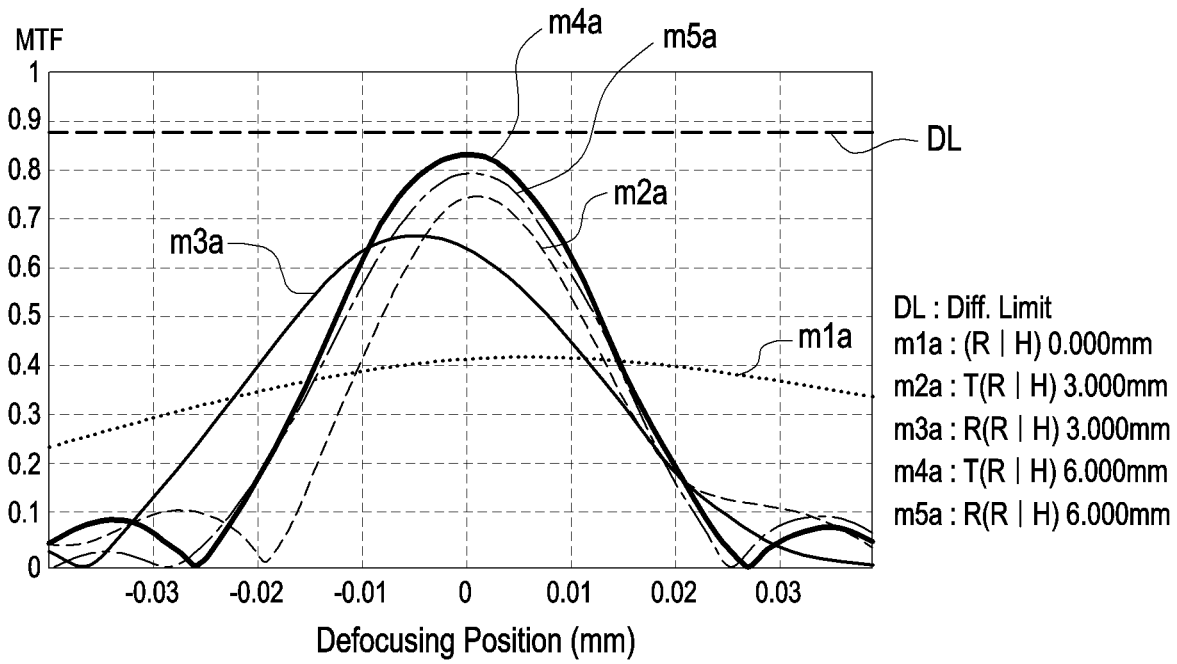
FIGS. 12A, 12B, and 12C are graphs illustrating the modulation transfer function performance of a camera module according to an embodiment of the disclosure.
Figure 12B:
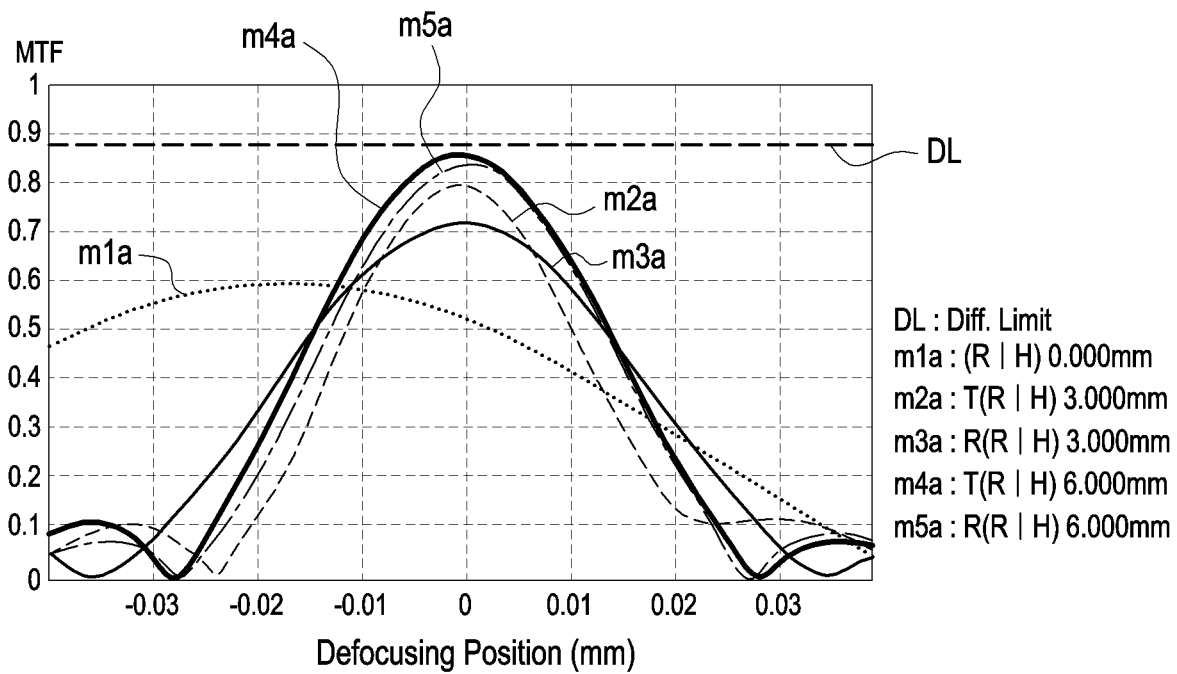
Figure 12C:
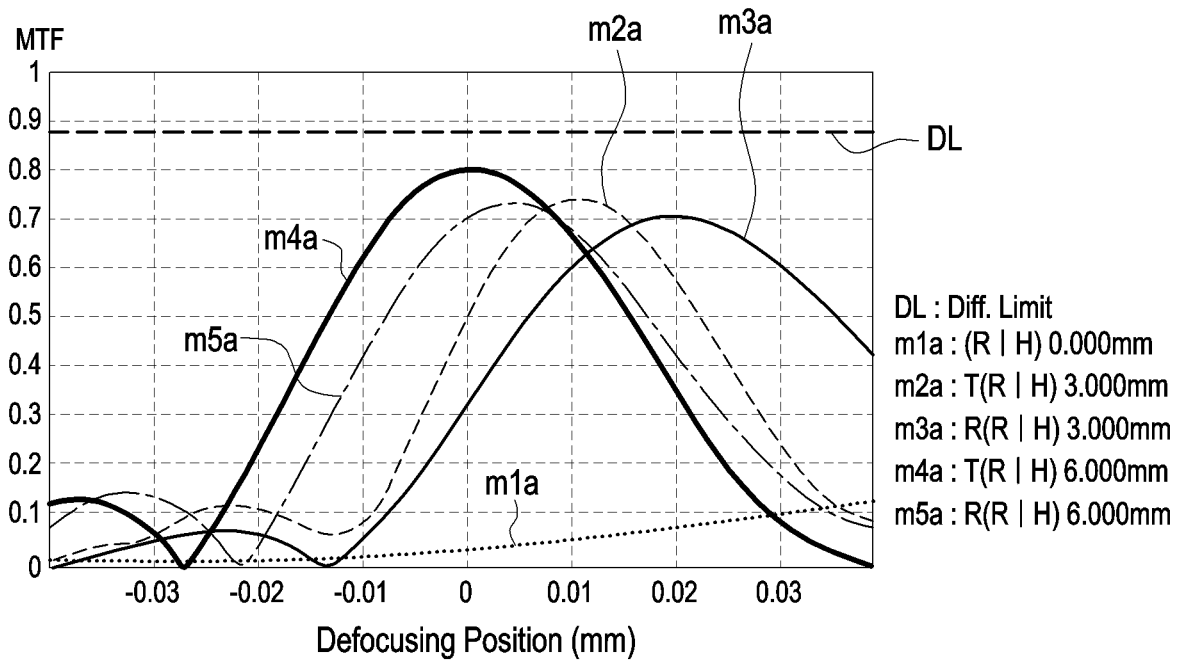
Figure 13A:
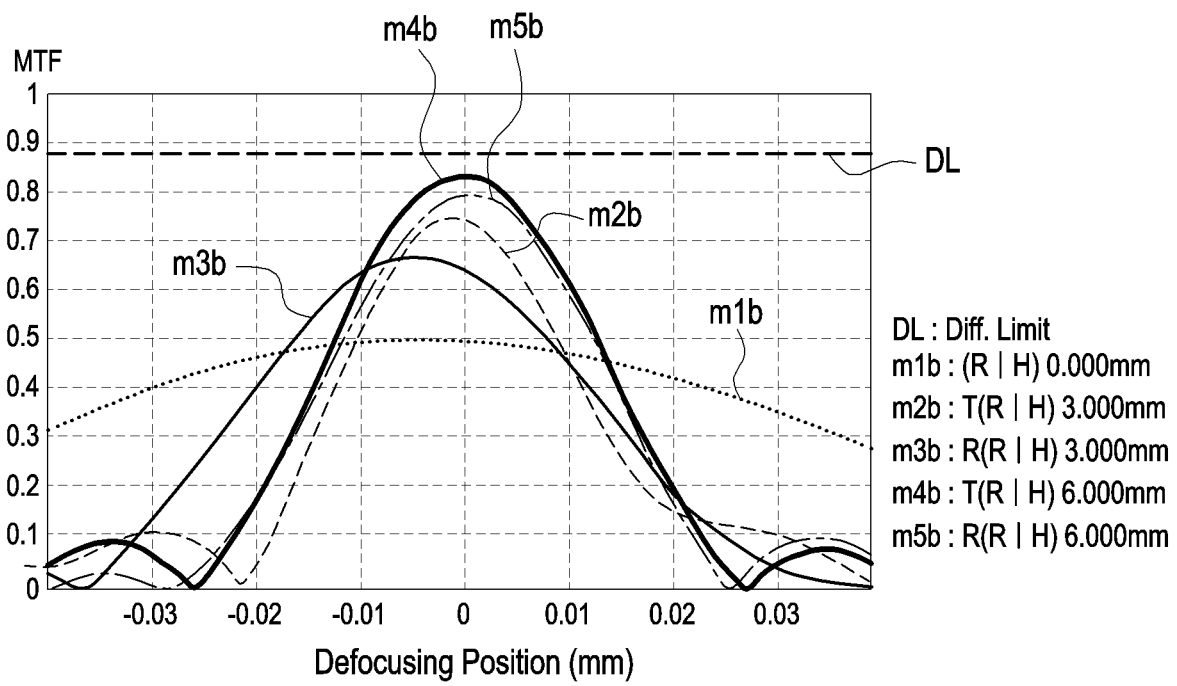
FIGS. 13A, 13B, and 13C are graphs illustrating the modulation transfer function performance changed based on a distance between a first lens group and a second lens group according to an embodiment of the disclosure.
Figure 13B:
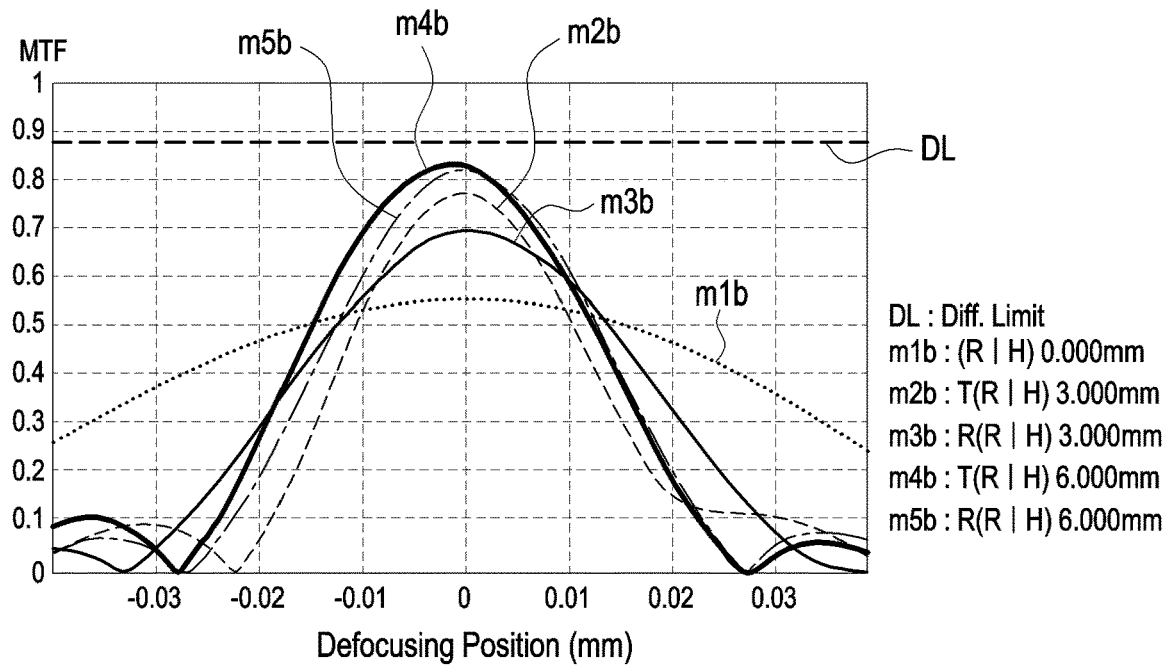
Figure 13C:
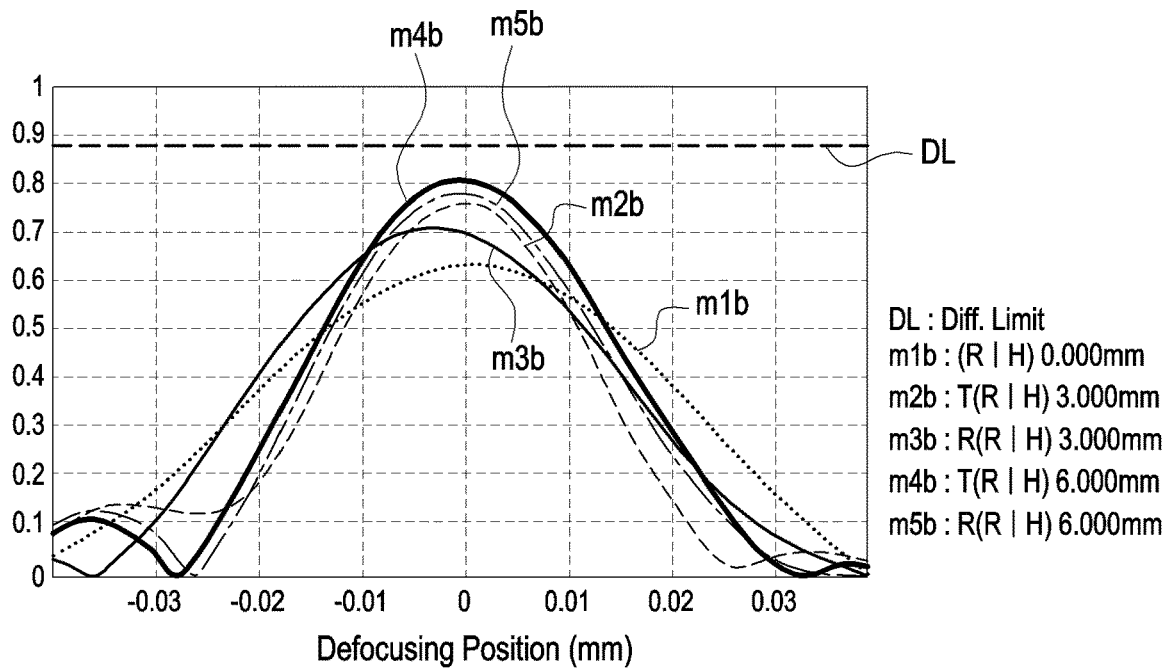

FIGS. 12A, 12B, and 12C are graphs illustrating the modulation transfer function performance of a camera module according to an embodiment of the disclosure. FIGS. 13A, 13B, and 13C are graphs illustrating the modulation transfer function performance changed based on a distance between a first lens group and a second lens group according to an embodiment of the disclosure. For example, FIGS. 12A and 13A are graphs showing the modulation transfer function performance in a first state in which the subject (e.g., the subject S of FIG. 5) and the electronic device (e.g., the electronic device 101 of FIG. 2) are positioned sufficiently far (e.g., at infinity). FIGS. 12B and 13B are graphs showing the modulation transfer function performance in a second state in which the first distance d1 between the subject (e.g., the subject S of FIG. 5) and the electronic device (e.g., the electronic device 101 of FIG. 2) is 2000 mm. FIGS. 12C and 13C are graphs showing the modulation transfer function performance in a third state in which the first distance d1 between the subject (e.g., the subject S of FIG. 5) and the electronic device (e.g., the electronic device 101 of FIG. 2) is 150 mm.

Referring to FIGS. 12A, 12B, 12C, 13A, 13B, and 13C, the electronic device (e.g., the electronic device 101 of FIG. 2) may enhance the image quality of the camera module 300 by correcting the modulation transfer function (MTF) of the lens assembly 301 by adjusting the second distance d2 between the first lens group 302 and the second lens group 304. The modulation transfer function may refer to a ratio denoting the degree at which the original image of the subject (e.g., the subject S of FIG. 5) may pass through the lens assembly (e.g., the lens assembly 301 of FIG. 5) and be represented as an image forming on the image sensor 380.

In FIGS. 12A, 12B, 12C, 13A, 13B, and 13C, R may be the radial value, T may mean the tangential value, and R|H may be the contrast value measured in the center of the frame with respect to the number of line pairs per unit length (e.g., line pairs/mm, lp/mm) at the scale transverse to the horizontal axis of the chart (e.g., the distance from the center of the lens assembly 301 to the edge). For example, the pre-first correction modulation transfer function m1a and the post-first correction modulation transfer function m1b may be the values of the modulation transfer function according to the defocusing position when R|H is 0.000 mm, the pre-second correction modulation transfer function m2a and the post-second correction modulation transfer function m2b may be the tangential values of the modulation transfer function according to the defocusing position when R|H is 3.000 mm, the pre-third correction modulation transfer function m3a and the post-third correction modulation transfer function m3b may be the radial values of the modulation transfer function according to the defocusing position when R|H is 3.000 mm, the pre-fourth correction modulation transfer function m4a and the post-fourth correction modulation transfer function m4b may be the tangential values of the modulation transfer function according to the defocusing position when R|H is 6.000 mm, and the pre-fifth correction modulation transfer function ma and the post-fifth correction modulation transfer function m5b may be the radial values of the modulation transfer function according to the defocusing position when R|H is 6.000 mm.

According to certain embodiments, the performance of the camera module 300 may be enhanced by changing the second distance d2 between the first lens group 302 and the second lens group 304. For example, in the first state (e.g., FIG. 12A or 13A) in which the subject (e.g., the subject S of FIG. 5) is positioned sufficiently away from the camera module 300 relative to the intervals between the lenses 310, 320, 330, 340, 350, and 360 of the lens assembly 301, the values of the modulation transfer functions m1b, m2b, m3b, m4b, and m5b after the first to fifth correction may be closer to 1 than the values of the modulation transfer functions m1a, m2a, m3a, m4a, and m5a before the first to fifth correction.

According to certain embodiments, the closer the value of the modulation transfer function of the lens assembly 301 is to the diffraction limit value DL, the higher the performance of the camera module 300 may be. For example, as the size of the second distance d2 is changed, the modulation transfer functions m1b, m2b, m3b, m4b, and m5b after the first to fifth correction of the lens assembly 301 may be closer to the diffraction limit value DL than the pre-correction modulation transfer functions m1a, m2a, m3a, m4a, and m5a are.

According to certain embodiments, as the radial value R and the tangential value T of the modulation transfer function of the lens assembly 301 are more similar, the performance of the camera module 300 may increase. For example, distortion of the center and edges of the image obtained by the camera module 300 may be reduced. According to an embodiment, as the size of the second distance d2 is changed, the difference between the post-second correction modulation transfer function m2b and post-third correction modulation transfer function m3b of the corrected lens assembly 301 may be smaller than the difference between the pre-second correction modulation transfer function m2a and the pre-third correction modulation transfer function m3a, and the difference between the post-fourth correction modulation transfer function m4b and the post-fifth correction modulation transfer function m5b may be smaller than the difference between the pre-fourth correction modulation transfer function m4a and the pre-fifth correction modulation transfer function m5a.

According to an embodiment of the disclosure, an electronic device (e.g., the electronic device 101 of FIG. 4) may comprise a lens assembly (e.g., the lens assembly 302 or 304 of FIG. 5) including a first lens group (e.g., the first lens group 302 of FIG. 5) having positive (+) refractive power and a second lens group (e.g., the second lens group 304 of FIG. 5) having negative (−) refractive power and an image sensor (e.g., the image sensor 380 of FIG. 5) configured to output an image signal based on light transmitted through the first lens group and the second lens group. A second distance (e.g., the second distance d2 of FIG. 5) between the first lens group and the second lens group and a third distance (e.g., the third distance d3 of FIG. 5) between the lens assembly and the image sensor may be configured to be changed based on a first distance (e.g., the first distance d1 of FIG. 5) between a subject (e.g., the subject S of FIG. 5) and the electronic device.

According to an embodiment, the electronic device may be configured to meet Equation 2 below.

$$\left(1 - \left(\frac{FOV_{FINITY}}{FOV_{INFINITY}}\right)\right) * 100,$$ [Equation 2]

where $FOV_{FINITY}$ refers to an angle of view at a finite distance of the lens assembly, and $FOV_{INFINITY}$ refers to an angle of view at an infinite distance of the lens assembly.

According to an embodiment, the electronic device may further comprise at least one optical filter (e.g., the optical filter 390 of FIG. 5) disposed between the lens assembly and the image sensor. The at least one optical filter may include at least one of a low-pass filter, an infrared filter, or a cover glass.

According to an embodiment, the lens assembly may include an aspheric lens having at least one aspherical surface.

According to an embodiment, the first lens group may include a first lens (e.g., the first lens 310 of FIG. 5), a second lens (e.g., the second lens 320 of FIG. 5), a third lens (e.g., the third lens 330 of FIG. 5), a fourth lens (e.g., the fourth lens 340 of FIG. 5), and a fifth lens (e.g., the fifth lens 350 of FIG. 5) arranged in order from the subject, and the second lens group may include a sixth lens (e.g., the sixth lens 360 of FIG. 5) positioned between the fifth lens and the image sensor.

According to an embodiment, the fifth lens may include a ninth surface (e.g., the ninth surface 350a of FIG. 5) facing the fourth lens and a tenth surface (e.g., the tenth surface 350b of FIG. 5) facing the sixth lens. The sixth lens may include an eleventh surface (e.g., the eleventh surface 360a of FIG. 5) facing the fifth lens. In an area adjacent to an optical axis (e.g., the optical axis O of FIG. 5), the tenth surface may be convex, and at least a portion of the eleventh surface may be concave.

According to an embodiment, the first lens group may include a first lens (e.g., the first lens 310 of FIG. 7), a second lens (e.g., the second lens 320 of FIG. 7), a third lens (e.g., the third lens 330 of FIG. 7), a fourth lens (e.g., the fourth lens 340 of FIG. 7), a fifth lens (e.g., the fifth lens 350 of FIG. 7), and a sixth lens (e.g., the sixth lens 360 of FIG. 7) arranged in order from the subject, and the second lens group may include a seventh lens (e.g., the seventh lens 370 of FIG. 7) positioned between the sixth lens and the image sensor.

According to an embodiment, the sixth lens may include an eleventh surface (e.g., the eleventh surface 360a of FIG. 7) facing the fifth lens and a twelfth surface (e.g., the twelfth surface 360b of FIG. 7) facing the seventh lens, and the seventh lens may include a thirteenth surface (e.g., the thirteenth surface 370a of FIG. 7) facing the sixth lens and a fourteenth surface (e.g., the fourteenth surface 370b of FIG. 7) facing the image sensor. In an area adjacent to an optical axis (e.g., the optical axis O of FIG. 7), at least a portion of the eleventh surface and at least a portion of the fourteenth surface may be convex, and at least a portion of the twelfth surface and at least a portion of the thirteenth surface may be concave.

According to an embodiment, the sixth lens may include an eleventh surface (e.g., the eleventh surface 360a of FIG. 8) facing the fifth lens and a twelfth surface (e.g., the twelfth surface 360b of FIG. 8) facing the seventh lens, and the seventh lens may include a thirteenth surface (e.g., the thirteenth surface 370a of FIG. 8) facing the sixth lens and a fourteenth surface (e.g., the fourteenth surface 370*b* of FIG. 8) facing the image sensor. In an area adjacent to an optical axis (e.g., the optical axis O of FIG. 8), at least a portion of the eleventh surface, at least a portion of the thirteenth surface, and at least a portion of the fourteenth surface may be concave, and at least a portion of the twelfth surface may be convex. According to another embodiment, the sixth lens may include an eleventh surface (e.g., the eleventh surface 360*a* of FIG. 9) facing the fifth lens and a twelfth surface (e.g., the twelfth surface 360*b* of FIG. 9) facing the seventh lens, and the seventh lens may include a thirteenth surface (e.g., the thirteenth surface 370*a* of FIG. 9) facing the sixth lens and a fourteenth surface (e.g., the fourteenth surface 370*b* of FIG. 9) facing the image sensor. In an area adjacent to an optical axis (e.g., the optical axis O of FIG. 9), at least a portion of the eleventh surface may be convex, and at least a portion of the twelfth surface, at least a portion of the thirteenth surface, and at least a portion of the fourteenth surface may be concave. According to yet another embodiment, the sixth lens may include an eleventh surface (e.g., the eleventh surface 360*a* of FIG. 10) facing the fifth lens and a twelfth surface (e.g., the twelfth surface 360*b* of FIG. 10) facing the seventh lens, and the seventh lens may include a thirteenth surface (e.g., the thirteenth surface 370*a* of FIG. 10) facing the sixth lens and a fourteenth surface (e.g., the fourteenth surface 370*b* of FIG. 10) facing the image sensor. In an area adjacent to an optical axis (e.g., the optical axis O of FIG. 10), at least a portion of the eleventh surface and at least a portion of the twelfth surface may be convex, and at least a portion of the thirteenth surface and at least a portion of the fourteenth surface may be concave.

According to an embodiment, the first lens group may include a first lens (e.g., the first lens 310 of FIG. 11), a second lens (e.g., the second lens 320 of FIG. 11), a third lens (e.g., the third lens 330 of FIG. 11), and a fourth lens (e.g., the fourth lens 340 of FIG. 11) arranged in order from the subject, and the second lens group may include a fifth lens (e.g., the fifth lens 350 of FIG. 11) positioned between the fourth lens and the image sensor.

According to an embodiment, the fourth lens may include a seventh surface (e.g., the seventh surface 340*a* of FIG. 11) facing the third lens and an eighth surface (e.g., the eighth surface 340*b* of FIG. 11) facing the fifth lens. The fifth lens may include a ninth surface (e.g., the ninth surface 350*a* of FIG. 11) facing the fourth lens. At least a portion of the eighth surface may be convex, and at least a portion of the ninth surface may be concave. According to an embodiment, the Abbe number of the second lens group may be larger than an Abbe number of a lens of the first lens group.

According to an embodiment, the electronic device may further comprise a housing (e.g., the housing 210 of FIG. 2) configured to receive at least a portion of the image sensor and the lens assembly, a display (e.g., the display 201 of FIG. 2) disposed in the housing, and a battery (e.g., the battery 250 of FIG. 4) disposed in the housing to supply power to the image sensor.

According to an embodiment of the disclosure, an electronic device (e.g., the electronic device 101 of FIG. 2) may comprise a housing (e.g., the housing 210 of FIG. 2), a camera module (e.g., the camera module 300 of FIG. 4) disposed in the housing, the camera module including a lens assembly (e.g., the lens assembly 301 of FIG. 5) including a first lens group (e.g., the first lens group 302 of FIG. 5) having positive (+) composite refractive power and including at least four lenses, a second lens group (e.g., the second lens group 304 of FIG. 5) having negative (−) refractive power, and an image sensor (e.g., the image sensor 380 of FIG. 5) configured to output an image signal based on light transmitted through the first lens group and the second lens group, and a processor (e.g., the processor 120 of FIG. 1) configured to adjust a second distance (e.g., the second distance d2 of FIG. 5) between the first lens group and the second lens group and a third distance (e.g., the third distance d3 of FIG. 5) between the lens assembly and the image sensor based on a first distance (e.g., the first distance d1 of FIG. 5) between a subject (e.g., the subject S of FIG. 5) and the electronic device.

According to an embodiment of the disclosure, a camera module (e.g., the camera module 300 of FIG. 5) may comprise a lens assembly (e.g., the lens assembly 301 of FIG. 5) including a first lens group (e.g., the first lens group 302 of FIG. 5) having positive (+) refractive power and a second lens group (e.g., the second lens group 304 of FIG. 5) having negative (−) refractive power and an image sensor (e.g., the image sensor 380 of FIG. 5) configured to output an image signal based on light transmitted through the first lens group and the second lens group. A second distance (e.g., the second distance d2 of FIG. 5) between the first lens group and the second lens group and a third distance (e.g., the third distance d3 of FIG. 5) between the lens assembly and the image sensor may be configured to be changed based on a first distance (e.g., the first distance d1 of FIG. 5) between a subject (e.g., the subject S of FIG. 5) and the camera module.

It is apparent to one of ordinary skill in the art that the lens assembly and the electronic device including the lens assembly of the disclosure as described above are not limited to the above-described embodiments and those shown in the drawings, and various changes, modifications, or alterations may be made thereto without departing from the scope of the disclosure.

The invention claimed is:

1. An electronic device comprising:
    a lens assembly including a first lens group having positive refractive power and a second lens group having negative refractive power, the second lens group is immediately adjacent to the first lens group; and
    an image sensor configured to output an image signal based on light transmitted through the first lens group and the second lens group, and wherein the image sensor is immediately adjacent to the second lens group,
    wherein a second distance between the first lens group and the second lens group and a third distance between the lens assembly and the image sensor are configured to be changed based on a first distance between a subject and the electronic device.

2. The electronic device of claim 1, further comprising at least one optical filter disposed between the lens assembly and the image sensor,
    wherein the at least one optical filter is a low-pass filter, an infrared filter, or a cover glass.

3. The electronic device of claim 1, wherein the lens assembly includes an aspheric lens having at least one aspherical surface.

4. The electronic device of claim 1, further comprising,
    a housing configured to receive at least a portion of the image sensor and the lens assembly;
    a display disposed in the housing; and
    a battery disposed in the housing to supply power to the image sensor.

5. An electronic device comprising:
a lens assembly including a first lens group having positive refractive power and a second lens group having negative refractive power; and
an image sensor configured to output an image signal based on light transmitted through the first lens group and the second lens group,
wherein a second distance between the first lens group and the second lens group and a third distance between the lens assembly and the image sensor are configured to be changed based on a first distance between a subject and the electronic device,
wherein the electronic device is configured to meet the following equation $$\left(1 - \left(\frac{FOV_{FINITY}}{FOV_{INFINITY}}\right)\right) * 100 < 10$$

wherein $FOV_{FINITY}$ refers to an angle of view at a finite distance of the lens assembly, and $FOV_{INFINITY}$ refers to an angle of view at an infinite distance of the lens assembly.

6. An electronic device comprising:
a lens assembly including a first lens group having positive refractive power and a second lens group having negative refractive power; and
an image sensor configured to output an image signal based on light transmitted through the first lens group and the second lens group,
wherein a second distance between the first lens group and the second lens group and a third distance between the lens assembly and the image sensor are configured to be changed based on a first distance between a subject and the electronic device, and
wherein the first lens group includes a first lens, a second lens, a third lens, a fourth lens, and a fifth lens arranged in order from the subject, and the second lens group includes a sixth lens positioned between the fifth lens and the image sensor.

7. The electronic device of claim 6, wherein the fifth lens includes a first surface facing the fourth lens and a second surface facing the sixth lens,
wherein the sixth lens includes a third surface facing the fifth lens, and
wherein in an area adjacent to an optical axis, the second surface is convex, and at least a portion of the third surface is concave.

8. An electronic device comprising:
a lens assembly including a first lens group having positive refractive power and a second lens group having negative refractive power; and
an image sensor configured to output an image signal based on light transmitted through the first lens group and the second lens group,
wherein a second distance between the first lens group and the second lens group and a third distance between the lens assembly and the image sensor are configured to be changed based on a first distance between a subject and the electronic device, and
wherein the first lens group includes a first lens, a second lens, a third lens, a fourth lens, a fifth lens, and a sixth lens arranged in order from the subject, and the second lens group includes a seventh lens positioned between the sixth lens and the image sensor.

9. The electronic device of claim 8, wherein the sixth lens includes a fourth surface facing the fifth lens and a fifth surface facing the seventh lens, and the seventh lens includes a sixth surface facing the sixth lens and a seventh surface facing the image sensor, and
wherein in an area adjacent to an optical axis, at least a portion of the fourth surface and at least a portion of the seventh surface are convex, and at least a portion of the fifth surface and at least a portion of the sixth surface are concave.

10. The electronic device of claim 8, wherein the sixth lens includes a fourth surface facing the fifth lens and a fifth surface facing the seventh lens, and the seventh lens includes a sixth surface facing the sixth lens and a seventh surface facing the image sensor, and
wherein in an area adjacent to an optical axis, at least a portion of the fourth surface, at least a portion of the sixth surface, and at least a portion of the seventh surface are concave, and at least a portion of the fifth surface is convex.

11. The electronic device of claim 8, wherein the sixth lens includes a fourth surface facing the fifth lens and a fifth surface facing the seventh lens, and the seventh lens includes a sixth surface facing the sixth lens and a seventh surface facing the image sensor, and
wherein in an area adjacent to an optical axis, at least a portion of the fourth surface is convex, and at least a portion of the fifth surface, at least a portion of the sixth surface, and at least a portion of the seventh surface are concave.

12. The electronic device of claim 8, wherein the sixth lens includes a fourth surface facing the fifth lens and a fifth surface facing the seventh lens, and the seventh lens includes a sixth surface facing the sixth lens and a seventh surface facing the image sensor, and
wherein in an area adjacent to an optical axis, at least a portion of the fourth surface and at least a portion of the fifth surface are convex, and at least a portion of the sixth surface and at least a portion of the seventh surface are concave.

13. An electronic device comprising:
a lens assembly including a first lens group having positive refractive power and a second lens group having negative refractive power; and
an image sensor configured to output an image signal based on light transmitted through the first lens group and the second lens group,
wherein a second distance between the first lens group and the second lens group and a third distance between the lens assembly and the image sensor are configured to be changed based on a first distance between a subject and the electronic device, and
wherein the first lens group includes a first lens, a second lens, a third lens, and a fourth lens arranged in order from the subject, and the second lens group includes a fifth lens positioned between the fourth lens and the image sensor.

14. The electronic device of claim 13, wherein the fourth lens includes an eighth surface facing the third lens and a ninth surface facing the fifth lens,
wherein the fifth lens includes a tenth surface facing the fourth lens, and
wherein at least a portion of the ninth surface is convex, and at least a portion of the tenth surface is concave.

15. An electronic device comprising:
a lens assembly including a first lens group having positive refractive power and a second lens group having negative refractive power; and
an image sensor configured to output an image signal based on light transmitted through the first lens group and the second lens group,
wherein a second distance between the first lens group and the second lens group and a third distance between the lens assembly and the image sensor are configured to be changed based on a first distance between a subject and the electronic device,
wherein an Abbe number of the second lens group is larger than an Abbe number of one lens of the first lens group.

16. An electronic device, comprising,
a housing;
a camera module disposed in the housing,
the camera module including a lens assembly including a first lens group having positive composite refractive power and including at least four lenses, a second lens group having negative refractive power, and an image sensor configured to output an image signal based on light transmitted through the first lens group and the second lens group; and
a processor configured to adjust a second distance between the first lens group and the second lens group and a third distance between the lens assembly and the image sensor based on a first distance between a subject and the electronic device.

17. The electronic device of claim 16, wherein the electronic device is configured to meet the following equation $$\left(1 - \left(\frac{FOV_{FINITY}}{FOV_{INFINITY}}\right)\right) * 100 < 10$$

wherein $FOV_{FINITY}$ refers to an angle of view at a finite distance of the lens assembly, and $FOV_{INFINITY}$ refers to an angle of view at an infinite distance of the lens assembly.

18. The electronic device of claim 16, wherein:
the camera module includes at least one optical filter disposed between the lens assembly and the image sensor, and wherein
the at least one optical filter is a low-pass filter, an infrared filter, or a cover glass.

19. The electronic device of claim 16, wherein the lens assembly includes an aspheric lens having at least one aspherical surface.

20. An electronic device comprising:
a lens assembly including a first lens group having positive refractive power and including at least four lenses, and a second lens group having negative refractive power; and
an image sensor configured to output an image signal based on light transmitted through the first lens group and the second lens group,
wherein a second distance between the first lens group and the second lens group and a third distance between the lens assembly and the image sensor are configured to be changed based on a first distance between a subject and the electronic device.

* * * * *